US012401782B2

(12) United States Patent
Leleannec et al.

(10) Patent No.: US 12,401,782 B2
(45) Date of Patent: Aug. 26, 2025

(54) INTRA SUB PARTITIONS FOR VIDEO ENCODING AND DECODING COMBINED WITH MULTIPLE TRANSFORM SELECTION, MATRIX WEIGHTED INTRA PREDICTION OR MULTI-REFERENCE-LINE INTRA PREDICTION

(71) Applicant: InterDigital CE Patent Holdings, SAS, Paris (FR)

(72) Inventors: Fabrice Leleannec, Betton (FR); Karam Naser, Mouazé (FR); Philippe Bordes, Laille (FR); Tangi Poirier, Thorigné-Fouillard (FR); Franck Galpin, Thorigne-Fouillard (FR); Gagan Rath, Rennes (FR); Antoine Robert, Mézières sur Couesnon (FR)

(73) Assignee: InterDigital CE Patent Holdings, SAS, Paris (FR)

(*) Notice: Subject to any disclaimer, the term of this patent is extended or adjusted under 35 U.S.C. 154(b) by 95 days.

(21) Appl. No.: 17/781,901

(22) PCT Filed: Nov. 30, 2020

(86) PCT No.: PCT/EP2020/083826
§ 371 (c)(1),
(2) Date: Jun. 2, 2022

(87) PCT Pub. No.: WO2021/110568
PCT Pub. Date: Jun. 10, 2021

(65) Prior Publication Data

US 2023/0024223 A1 Jan. 26, 2023

(30) Foreign Application Priority Data

Dec. 5, 2019 (EP) .................................... 19306575
Dec. 5, 2019 (EP) .................................... 19306576
Dec. 5, 2019 (EP) .................................... 19306577

(51) Int. Cl.
*H04N 19/119* (2014.01)
*H04N 19/105* (2014.01)
(Continued)

(52) U.S. Cl.
CPC ......... *H04N 19/105* (2014.11); *H04N 19/132* (2014.11); *H04N 19/176* (2014.11)

(58) Field of Classification Search
CPC .... H04N 19/11; H04N 19/105; H04N 19/119; H04N 19/132; H04N 19/176;
(Continued)

(56) References Cited

U.S. PATENT DOCUMENTS 8,902,978 B2 * 12/2014 Lim .................... H04N 19/154 382/238
9,100,621 B2 * 8/2015 Jeon .................... H04N 19/117
(Continued)

FOREIGN PATENT DOCUMENTS

CN 110235444 A 9/2019
CN 110312126 A 10/2019
(Continued)

OTHER PUBLICATIONS

JVET—Test Model 7 of Versatile Video Coding (VTM 7) (Year: 2019).*
(Continued)

*Primary Examiner* — Philip P. Dang
(74) *Attorney, Agent, or Firm* — Condo Roccia Koptiw LLP

(57) ABSTRACT

In an encoding apparatus or a decoding apparatus, an encoding method or decoding method combines various coding tools with intra sub partitioning mode in which a coding unit is split in multiple sub partitions. At least one
(Continued)

embodiment particularly aims at the selection of primary transforms among a set of multiple transforms for video encoding or decoding of intra sub block partitions. At least one embodiment particularly aims at intra coding using Matrix-Based Intra Prediction mode combined with Intra Sub Partition mode. At least one embodiment particularly aims at intra coding using Multi-Reference-Line intra prediction mode combined with Intra Sub Partition mode.

18 Claims, 33 Drawing Sheets

(51) Int. Cl.
*H04N 19/132* (2014.01)
*H04N 19/176* (2014.01)

(58) Field of Classification Search
CPC .... H04N 19/593; H04N 19/70; H04N 19/463; H04N 19/12; H04N 19/157
See application file for complete search history.

(56) References Cited

U.S. PATENT DOCUMENTS

| | | | | |
|---|---|---|---|---|
| 9,100,649 | B2 * | 8/2015 | Park | H04N 19/176 |
| 9,154,796 | B2 * | 10/2015 | Seregin | H04N 19/11 |
| 9,467,692 | B2 * | 10/2016 | Rapaka | H04N 19/46 |
| 9,532,058 | B2 * | 12/2016 | Chien | H04N 19/176 |
| 9,544,597 | B1 | 1/2017 | Han et al. | |
| 9,736,454 | B2 * | 8/2017 | Hannuksela | H04N 19/597 |
| 9,749,651 | B2 * | 8/2017 | Merkle | H04N 19/51 |
| 9,756,330 | B2 * | 9/2017 | Merkle | H04N 19/46 |
| 10,003,810 | B2 * | 6/2018 | Chuang | H04N 19/33 |
| 10,070,128 | B2 * | 9/2018 | Ugur | H04N 19/19 |
| 10,136,140 | B2 * | 11/2018 | Li | H04N 19/56 |
| 10,142,627 | B2 * | 11/2018 | Zhao | H04N 19/593 |
| 10,171,819 | B2 * | 1/2019 | Ramamurthy | H04N 19/147 |
| 10,244,256 | B2 * | 3/2019 | Ikai | H04N 19/176 |
| 10,313,668 | B2 * | 6/2019 | Gisquet | H04N 19/176 |
| 10,390,044 | B2 * | 8/2019 | Karczewicz | H04N 19/61 |
| 10,531,084 | B2 * | 1/2020 | Yoo | H04N 19/107 |
| 10,542,264 | B2 * | 1/2020 | Panusopone | H04N 19/159 |
| 10,574,982 | B2 * | 2/2020 | Merkle | H04N 19/167 |
| 10,587,873 | B2 * | 3/2020 | Koo | H04N 19/11 |
| 10,681,354 | B2 * | 6/2020 | Heo | H04N 19/13 |
| 10,757,406 | B2 * | 8/2020 | Lee | H04N 19/182 |
| 10,764,576 | B2 * | 9/2020 | Li | H04N 19/11 |
| 10,819,977 | B2 * | 10/2020 | Zhao | H04N 19/176 |
| 10,841,593 | B2 * | 11/2020 | Zhao | H04N 19/136 |
| 10,904,567 | B2 * | 1/2021 | Kang | H04N 19/18 |
| 10,917,660 | B2 * | 2/2021 | Vanam | H04N 19/593 |
| 11,051,011 | B2 * | 6/2021 | Lee | H04N 19/105 |
| 11,102,509 | B2 * | 8/2021 | Ko | H04N 19/11 |
| 11,128,862 | B2 * | 9/2021 | Cho | H04N 19/176 |
| 11,184,639 | B2 * | 11/2021 | Lee | H04N 19/176 |
| 11,202,063 | B2 * | 12/2021 | Lee | H04N 19/159 |
| 11,218,704 | B2 * | 1/2022 | Lim | H04N 19/105 |
| 11,228,755 | B2 * | 1/2022 | Lee | H04N 19/105 |
| 11,233,990 | B2 * | 1/2022 | Kim | H04N 19/593 |
| 11,259,047 | B2 * | 2/2022 | Lee | H04N 19/44 |
| 11,350,107 | B2 * | 5/2022 | Jun | H04N 19/176 |
| 11,368,682 | B2 * | 6/2022 | Sim | H04N 19/635 |
| 11,375,185 | B2 * | 6/2022 | Lee | H04N 19/109 |
| 11,405,620 | B2 * | 8/2022 | Jun | H04N 19/126 |
| 11,438,582 | B2 * | 9/2022 | Lee | H04N 19/159 |
| 11,463,689 | B2 * | 10/2022 | Zhao | H04N 19/11 |
| 11,616,987 | B2 * | 3/2023 | Jeong | H04N 19/70 375/240.29 |
| 11,743,456 | B2 * | 8/2023 | Lee | H04N 19/176 375/240.02 |
| 11,831,910 | B2 * | 11/2023 | Ko | H04N 19/105 |
| 11,909,961 | B2 * | 2/2024 | Ko | H04N 19/50 |
| 2013/0287093 | A1 * | 10/2013 | Hannuksela | H04N 19/103 375/240.02 |
| 2014/0092978 | A1 * | 4/2014 | Bugdayci | H04N 19/30 375/240.16 |
| 2015/0103906 | A1 * | 4/2015 | Zhao | H04N 19/593 375/240.12 |
| 2015/0271515 | A1 * | 9/2015 | Pang | H04N 19/70 375/240.16 |
| 2016/0373742 | A1 * | 12/2016 | Zhao | H04N 19/136 |
| 2016/0373770 | A1 * | 12/2016 | Zhao | H04N 19/593 |
| 2016/0373782 | A1 * | 12/2016 | Zhao | H04N 19/463 |
| 2017/0094274 | A1 * | 3/2017 | Chien | H04N 19/159 |
| 2017/0347102 | A1 | 11/2017 | Panusopone et al. | |
| 2018/0160113 | A1 * | 6/2018 | Jeong | H04N 19/109 |
| 2019/0166375 | A1 | 5/2019 | Jun et al. | |
| 2019/0306494 | A1 | 10/2019 | Chang et al. | |
| 2020/0296417 | A1 * | 9/2020 | Ko | H04N 19/70 |
| 2021/0076028 | A1 | 3/2021 | Jin et al. | |
| 2021/0160487 | A1 * | 5/2021 | Kim | H04N 19/147 |
| 2023/0024223 | A1 * | 1/2023 | Le Leannec | H04N 19/132 |

FOREIGN PATENT DOCUMENTS

| | | | |
|---|---|---|---|
| CN | 109565593 | A | 4/2023 |
| WO | 2018/205950 | A1 | 11/2018 |
| WO | 2019190181 | A1 | 10/2019 |

OTHER PUBLICATIONS

Anonymous, "High Efficiency Video Coding", Series H: Audiovisual and Multimedia Systems, Infrastructure of Audiovisual Services—Coding of Moving Video, Recommendation ITU-T H.265 Standard, Telecommunication Standardization Sector of ITU, Dec. 2016, 664 pages.

Bross et al., "Versatile Video Coding (Draft 7)", Joint Video Experts Team (JVET) of ITU-T SG 16 WP 3 and ISO/ IEC JTC 1/SC 29/WG 11, Document: JVET-P2001-vE, 16th Meeting, Geneva, Switzerland, Oct. 1, 2019, 492 pages.

Anonymous, "Advanced video coding for generic audiovisual services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Feb. 2014, 790 pages.

Naser, et al., "Non-CE6: Shape Adaptive Transform Selection for ISP, SBT and MTS", Joint Video Experts Team (JVET) of ITU-T SG 16 WP 3 and ISO/IEC JTC 1/SC 29/WG 11, Document: JVET-N0388-v3; 14th Meeting: Geneva, Switzerland, Mar. 19, 2019, 5 pages.

Naser et al., "Non-CE6: Simplified Transform Selection for ISP", Joint Video Experts Team (JVET) of ITU-T SG 16 WP 3 and ISO/IEC JTC 1/SC 29/WG 11, Document: JVET-O0528, 15th Meeting: Gothenburg, Sweden, Jul. 3, 2019, 4 pages.

Chen et al., Test Model 5 of Versatile Video Coding (VTM 5); International Organization for Standardization, ISO/IEC JTC1/SC29/WG11, Coding of Moving Pictures and Audio, Document: N18371, Geneva, Switzerland, Mar. 2019, 77 pages.

Le Leannec, et al., "Non-CE3: simplified MRL and ISP mode coding", Joint Video Experts Team (JVET) of ITU-T SG 16 WP 3 and ISO/IEC JTC 1/SC 29/WG 11, Document JVET-O0467, 15th Meeting: Gothenburg, SE, Jul. 3-12, 2019, 5 pages.

Hongbin, et al., "Non-CE3: Cleanup for ISP flag and MRL index signalling", Joint Video Experts Team (JVET) of ITU-T SG 16 WP 3 and ISO/IEC JTC 1/SC 29/WG 11, JVET-O0197, 15th Meeting: Gothenburg, SE, Jul. 3-12, 2019, 6 pages.

* cited by examiner

Width (pixels)

Height (pixels)

| | 2 | 4 | 8 | 16 | 32 | 64 |
|---|---|---|---|---|---|---|
| 2 | {DCT2,DCT2} | {DST7,DCT2} | {DST7,DCT2} | {DST7,DCT2} | {DCT2,DCT2} | {DCT2,DCT2} |
| 4 | {DCT2,DST7} | {DST7,DST7} | {DST7,DST7} | {DST7,DST7} | {DCT2,DST7} | {DCT2,DST7} |
| 8 | {DCT2,DST7} | {DST7,DST7} | {DST7,DST7} | {DST7,DST7} | {DCT2,DST7} | {DCT2,DST7} |
| 16 | {DCT2,DST7} | {DST7,DST7} | {DST7,DST7} | {DST7,DST7} | {DCT2,DST7} | {DCT2,DST7} |
| 32 | {DCT2,DCT2} | {DST7,DCT2} | {DST7,DCT2} | {DST7,DCT2} | {DCT2,DCT2} | {DCT2,DCT2} |
| 64 | {DCT2,DCT2} | {DST7,DCT2} | {DST7,DCT2} | {DST7,DCT2} | {DCT2,DCT2} | {DCT2,DCT2} |

{Horizontal transform, Vertical transform}

8.7.4 Transformation process for scaled transform coefficients
8.7.4.1 General
Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

...

The variable implicitMtsEnabled is derived as follows:
- If sps_mts_enabled_flag is equal to 1 and one of the following conditions is true, implicitMtsEnabled is set equal to 1:
- IntraSubPartitionsSplitType is not equal to ISP_NO_SPLIT and sps_explicit_mts_intra_enabled_flag equals to zero
- cu_sbt_flag is equal to 1 and Max( nTbW, nTbH ) is less than or equal to 32
- sps_explicit_mts_intra_enabled_flag is equal to 0 and CuPredMode[ 0 ][ xTbY ][ yTbY ] is equal to MODE_INTRA and lfnst_idx[ x0 ][ y0 ] is equal to 0 and intra_mip_flag[ x0 ][ y0 ] is equal to 0
- Otherwise, implicitMtsEnabled is set equal to 0.

The variable trTypeHor specifying the horizontal transform kernel and the variable trTypeVer specifying the vertical transform kernel are derived as follows:
- If cIdx is greater than 0, trTypeHor and trTypeVer are set equal to 0.
- Otherwise, if implicitMtsEnabled is equal to 1, the following applies:
- If IntraSubPartitionsSplitType is not equal to ISP_NO_SPLIT or sps_explicit_mts_intra_enabled_flag is equal to 0 and CuPredMode[ 0 ][ xTbY ][ yTbY ] is equal to MODE_INTRA, trTypeHor and trTypeVer are derived as follows:

trTypeHor = ( nTbW >= 4 && nTbW <= 16 ) ? 1 : 0 (8-975)
trTypeVer = ( nTbH >= 4 && nTbH <= 16 ) ? 1 : 0 (8-976)

- Otherwise (cu_sbt_flag is equal to 1), trTypeHor and trTypeVer are specified in Table 8-15 depending on cu_sbt_horizontal_flag and cu_sbt_pos_flag.
- Otherwise, trTypeHor and trTypeVer are specified in Table 8-14 depending on tu_mts_idx[ xTbY ][ yTbY ].

Figure 10

8.7.4 Transformation process for scaled transform coefficients
8.7.4.1 General
Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

...

The variable implicitMtsEnabled is derived as follows:
- If sps_mts_enabled_flag is equal to 1 and one of the following conditions is true, implicitMtsEnabled is set equal to 1:
- IntraSubPartitionsSplitType is not equal to ISP_NO_SPLIT and sps_explicit_mts_isp_enabled_flag equals to one
- cu_sbt_flag is equal to 1 and Max( nTbW, nTbH ) is less than or equal to 32
- sps_explicit_mts_intra_enabled_flag is equal to 0 and CuPredMode[ 0 ][ xTbY ][ yTbY ] is equal to MODE_INTRA and lfnst_idx[ x0 ][ y0 ] is equal to 0 and intra_mip_flag[ x0 ][ y0 ] is equal to 0
- Otherwise, implicitMtsEnabled is set equal to 0.

The variable trTypeHor specifying the horizontal transform kernel and the variable trTypeVer specifying the vertical transform kernel are derived as follows:
- If cIdx is greater than 0, trTypeHor and trTypeVer are set equal to 0.
- Otherwise, if implicitMtsEnabled is equal to 1, the following applies:
- If IntraSubPartitionsSplitType is not equal to ISP_NO_SPLIT or sps_explicit_mts_intra_enabled_flag is equal to 0 and CuPredMode[ 0 ][ xTbY ][ yTbY ] is equal to MODE_INTRA, trTypeHor and trTypeVer are derived as follows:

trTypeHor = ( nTbW >= 4 && nTbW <= 16 ) ? 1 : 0 (8-975)
trTypeVer = ( nTbH >= 4 && nTbH <= 16 ) ? 1 : 0 (8-976)
- Otherwise (cu_sbt_flag is equal to 1), trTypeHor and trTypeVer are specified in Table 8-15 depending on cu_sbt_horizontal_flag and cu_sbt_pos_flag.
- Otherwise, trTypeHor and trTypeVer are specified in Table 8-14 depending on tu_mts_idx[ xTbY ][ yTbY ].

Figure 11

| coding_unit( x0, y0, cbWidth, cbHeight, cqtDepth, treeType, modeType ) { | **Descriptor** |
|---|---|
| … | |
| if( CuPredMode[ chType ][ x0 ][ y0 ] = = MODE_INTRA && sps_act_enabled_flag && treeType = = SINGLE_TREE ) | |
| cu_act_enabled_flag | ae(v) |
| if( CuPredMode[ chType ][ x0 ][ y0 ] = = MODE_INTRA \| \| CuPredMode[ chType ][ x0 ][ y0 ] = = MODE_PLT ) { | |
| if( treeType = = SINGLE_TREE \| \| treeType = = DUAL_TREE_LUMA ) { | |
| if( pred_mode_plt_flag ) { | |
| palette_coding( x0, y0, cbWidth, cbHeight, treeType ) | |
| } else { | |
| if( sps_bdpcm_enabled_flag && cbWidth <= MaxTsSize && cbHeight <= MaxTsSize ) | |
| intra_bdpcm_luma_flag | ae(v) |
| if( intra_bdpcm_luma_flag ) | |
| intra_bdpcm_luma_dir_flag | ae(v) |
| else { | |
| if( sps_mip_enabled_flag ) | |
| intra_mip_flag[ x0 ][ y0 ] | ae(v) |
| if( intra_mip_flag[ x0 ][ y0 ] ) { | |
| intra_mip_transposed[ x0 ][ y0 ] | ae(v) |
| intra_mip_mode[ x0 ][ y0 ] | ae(v) |
| } else { | |
| if( sps_mrl_enabled_flag && ( ( y0 % CtbSizeY ) > 0 ) ) | |
| intra_luma_ref_idx[ x0 ][ y0 ] | ae(v) |
| } | |
| if( sps_isp_enabled_flag && intra_luma_ref_idx[x0][y0] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| intra_subpartitions_mode_flag[ x0 ][ y0 ] | ae(v) |
| if( intra_subpartitions_mode_flag[ x0 ][ y0 ] = = 1 ) | |
| intra_subpartitions_split_flag[ x0 ][ y0 ] | ae(v) |
| … | |
| } | |
| } | |
| } | |
| } | |

940 (rows "if( sps_mip_enabled_flag )" through "intra_mip_mode[ x0 ][ y0 ]")

980 (rows "if( sps_isp_enabled_flag && …" through "intra_subpartitions_split_flag[ x0 ][ y0 ]")

Figure 14

| coding_unit( x0, y0, cbWidth, cbHeight, cqtDepth, treeType, modeType ) { | **Descriptor** |
|---|---|
| … | |
| if( CuPredMode[ chType ][ x0 ][ y0 ] = = MODE_INTRA && sps_act_enabled_flag && treeType = = SINGLE_TREE ) | |
| cu_act_enabled_flag | ae(v) |
| if( CuPredMode[ chType ][ x0 ][ y0 ] = = MODE_INTRA \| \| CuPredMode[ chType ][ x0 ][ y0 ] = = MODE_PLT ) { | |
| if( treeType = = SINGLE_TREE \| \| treeType = = DUAL_TREE_LUMA ) { | |
| if( pred_mode_plt_flag ) { | |
| palette_coding( x0, y0, cbWidth, cbHeight, treeType ) | |
| } else { | |
| if( sps_bdpcm_enabled_flag && cbWidth <= MaxTsSize && cbHeight <= MaxTsSize ) | |
| intra_bdpcm_luma_flag | ae(v) |
| if( intra_bdpcm_luma_flag ) | |
| intra_bdpcm_luma_dir_flag | ae(v) |
| else { | |
| if( sps_mrl_enabled_flag && ( ( y0 % CtbSizeY ) > 0 ) ) | |
| intra_luma_ref_idx[ x0 ][ y0 ] | ae(v) |
| if( sps_mip_enabled_flag && intra_luma_ref_idx[x0][y0] = = 0) | |
| intra_mip_flag[ x0 ][ y0 ] | ae(v) |
| if( intra_mip_flag[ x0 ][ y0 ] ) { | |
| intra_mip_transposed[ x0 ][ y0 ] | ae(v) |
| intra_mip_mode[ x0 ][ y0 ] | ae(v) |
| } | |
| if( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| intra_subpartitions_mode_flag[ x0 ][ y0 ] | ae(v) |
| if( intra_subpartitions_mode_flag[ x0 ][ y0 ] = = 1 ) | |
| intra_subpartitions_split_flag[ x0 ][ y0 ] | ae(v) |
| … | |
| } | |
| } | |
| } | |
| } | |

1040 (brackets rows from "if( sps_mip_enabled_flag …" through "}")

1080 (brackets rows from "if( sps_isp_enabled_flag …" through "intra_subpartitions_split_flag[ x0 ][ y0 ]")

Figure 15

| | coding_unit( x0, y0, cbWidth, cbHeight, cqtDepth, treeType, modeType ) { | **Descriptor** |
|---|---|---|
| | … | |
| | if( CuPredMode[ chType ][ x0 ][ y0 ] = = MODE_INTRA && sps_act_enabled_flag && treeType = = SINGLE_TREE ) | |
| | cu_act_enabled_flag | ae(v) |
| | if( CuPredMode[ chType ][ x0 ][ y0 ] = = MODE_INTRA \| \| CuPredMode[ chType ][ x0 ][ y0 ] = = MODE_PLT ) { | |
| | if( treeType = = SINGLE_TREE \| \| treeType = = DUAL_TREE_LUMA ) { | |
| | if( pred_mode_plt_flag ) { | |
| | palette_coding( x0, y0, cbWidth, cbHeight, treeType ) | |
| | } else { | |
| | if( sps_bdpcm_enabled_flag && cbWidth <= MaxTsSize && cbHeight <= MaxTsSize ) | |
| | intra_bdpcm_luma_flag | ae(v) |
| | if( intra_bdpcm_luma_flag ) | |
| | intra_bdpcm_luma_dir_flag | ae(v) |
| | else { | |
| 1180 | if( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| | intra_subpartitions_mode_flag[ x0 ][ y0 ] | ae(v) |
| | if( intra_subpartitions_mode_flag[ x0 ][ y0 ] = = 1 ) | |
| | intra_subpartitions_split_flag[ x0 ][ y0 ] | ae(v) |
| 1140 | if( sps_mip_enabled_flag ) | |
| | intra_mip_flag[ x0 ][ y0 ] | ae(v) |
| | if( intra_mip_flag[ x0 ][ y0 ] ) { | |
| | intra_mip_transposed[ x0 ][ y0 ] | ae(v) |
| | intra_mip_mode[ x0 ][ y0 ] | ae(v) |
| | } else { | |
| 1110 | if( sps_mrl_enabled_flag && ( ( y0 % CtbSizeY ) > 0 ) && intra_subpartitions_mode_flag[ x0 ][ y0 ] = = 0) | |
| | intra_luma_ref_idx[ x0 ][ y0 ] | ae(v) |
| | … | |
| | } | |
| | } | |
| | } | |
| | } | |

Figure 16

| | coding_unit( x0, y0, cbWidth, cbHeight, cqtDepth, treeType, modeType ) { | **Descriptor** |
|---|---|---|
| | … | |
| | if( CuPredMode[ chType ][ x0 ][ y0 ] = = MODE_INTRA && sps_act_enabled_flag && treeType = = SINGLE_TREE ) | |
| | cu_act_enabled_flag | ae(v) |
| | if( CuPredMode[ chType ][ x0 ][ y0 ] = = MODE_INTRA \| \| CuPredMode[ chType ][ x0 ][ y0 ] = = MODE_PLT ) { | |
| | if( treeType = = SINGLE_TREE \| \| treeType = = DUAL_TREE_LUMA ) { | |
| | if( pred_mode_plt_flag ) { | |
| | palette_coding( x0, y0, cbWidth, cbHeight, treeType ) | |
| | } else { | |
| | if( sps_bdpcm_enabled_flag && cbWidth <= MaxTsSize && cbHeight <= MaxTsSize ) | |
| | intra_bdpcm_luma_flag | ae(v) |
| | if( intra_bdpcm_luma_flag ) | |
| | intra_bdpcm_luma_dir_flag | ae(v) |
| | else { | |
| 1280 | if( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| | intra_subpartitions_mode_flag[ x0 ][ y0 ] | ae(v) |
| | if( intra_subpartitions_mode_flag[ x0 ][ y0 ] = = 1 ) | |
| | intra_subpartitions_split_flag[ x0 ][ y0 ] | ae(v) |
| | if( sps_mip_enabled_flag ) | |
| | intra_mip_flag[ x0 ][ y0 ] | ae(v) |
| 1240 | if( intra_mip_flag[ x0 ][ y0 ] ) { | |
| | intra_mip_transposed[ x0 ][ y0 ] | ae(v) |
| | intra_mip_mode[ x0 ][ y0 ] | ae(v) |
| | } else { | |
| | if( sps_mrl_enabled_flag && ( ( y0 % CtbSizeY ) > 0 ) | |
| | intra_luma_ref_idx[ x0 ][ y0 ] | ae(v) |
| | … | |
| | } | |
| | } | |
| | } | |
| | } | |

Figure 17

8.7.4 Transformation process for scaled transform coefficients
8.7.4.1 General
Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array res[ x ][ y ] of residual samples with x = 0..nTbW − 1, y = 0..nTbH − 1.

...

The variable implicitMtsEnabled is derived as follows:
- If sps_mts_enabled_flag is equal to 1 and one of the following conditions is true, implicitMtsEnabled is set equal to 1:
- IntraSubPartitionsSplitType is not equal to ISP_NO_SPLIT and intra_mip_flag[ xTbComp ][ yTbComp ] is equal to 0
- ...
- Otherwise, implicitMtsEnabled is set equal to 0.

The variable trTypeHor specifying the horizontal transform kernel and the variable trTypeVer specifying the vertical transform kernel are derived as follows:
...

Figure 18

| coding_unit( x0, y0, cbWidth, cbHeight, cqtDepth, treeType, modeType ) { | Descriptor |
|---|---|
| ... | |
| if( cu_cbf ) { | |
| ... | |
| lfnstWidth = ( treeType == DUAL_TREE_CHROMA ) ? cbWidth / SubWidthC : ( ( IntraSubPartitionsSplitType == ISP_VER_SPLIT ) ? cbWidth / NumIntraSubPartitions : cbWidth ) | |
| lfnstHeight = ( treeType == DUAL_TREE_CHROMA ) ? cbHeight / SubHeightC : ( ( IntraSubPartitionsSplitType == ISP_HOR_SPLIT) ? cbHeight / NumIntraSubPartitions : cbHeight ) | |
| ... | |
| if( treeType != DUAL_TREE_CHROMA && lfnst_idx == 0 && transform_skip_flag[ x0 ][ y0 ][ 0 ] == 0 && Max( cbWidth, cbHeight ) <= 32 && Min(lfnstWidth, lfnstHeight) >= 4 && (IntraSubPartitionsSplit[ x0 ][ y0 ] == ISP_NO_SPLIT || intra_mip_flag[ x0 ][ y0 ] > 0) && cu_sbt_flag == 0 && MtsZeroOutSigCoeffFlag == 1 && tu_cbf_luma[ x0 ][ y0 ] ) { | |
| if( ( ( CuPredMode[ chType ][ x0 ][ y0 ] == MODE_INTER && sps_explicit_mts_inter_enabled_flag ) \|\| ( CuPredMode[ chType ][ x0 ][ y0 ] == MODE_INTRA && sps_explicit_mts_intra_enabled_flag ) ) ) | |
| mts_idx | ae(v) |
| } | |
| } | |

Figure 19

8.7.4 Transformation process for scaled transform coefficients

8.7.4.1 General

Inputs to this process are:

– a luma location ( xTbY, yTbY ) specifying the top-left sample of the current luma transform block relative to the top-left luma sample of the current picture,
– a variable nTbW specifying the width of the current transform block,
– a variable nTbH specifying the height of the current transform block,
– a variable cIdx specifying the colour component of the current block,
– an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

...

The variable implicitMtsEnabled is derived as follows:

– If sps_mts_enabled_flag is equal to 1 and one of the following conditions is true, implicitMtsEnabled is set equal to 1:
– IntraSubPartitionsSplitType is not equal to ISP_NO_SPLIT and sps_explicit_mts_intra_enabled_flag equals to zero
– cu_sbt_flag is equal to 1 and Max( nTbW, nTbH ) is less than or equal to 32
– sps_explicit_mts_intra_enabled_flag is equal to 0 and CuPredMode[ 0 ][ xTbY ][ yTbY ] is equal to MODE_INTRA and lfnst_idx[ x0 ][ y0 ] is equal to 0 and intra_mip_flag[ x0 ][ y0 ] is equal to 0
– Otherwise, implicitMtsEnabled is set equal to 0.

The variable trTypeHor specifying the horizontal transform kernel and the variable trTypeVer specifying the vertical transform kernel are derived as follows:

– If cIdx is greater than 0, trTypeHor and trTypeVer are set equal to 0.
– Otherwise, if implicitMtsEnabled is equal to 1, the following applies:
– If IntraSubPartitionsSplitType is not equal to ISP_NO_SPLIT or sps_explicit_mts_intra_enabled_flag is equal to 0 and CuPredMode[ 0 ][ xTbY ][ yTbY ] is equal to MODE_INTRA, trTypeHor and trTypeVer are derived as follows:

trTypeHor = ( nTbW >= 4 && nTbW <= 16 ) ? 1 : 0 (8-975)

trTypeVer = ( nTbH >= 4 && nTbH <= 16 ) ? 1 : 0 (8-976)

– Otherwise (cu_sbt_flag is equal to 1), trTypeHor and trTypeVer are specified in Table 8-15 depending on cu_sbt_horizontal_flag and cu_sbt_pos_flag.
– Otherwise, trTypeHor and trTypeVer are specified in Table 8-14 depending on tu_mts_idx[ xTbY ][ yTbY ].

Figure 20

| coding_unit( x0, y0, cbWidth, cbHeight, cqtDepth, treeType, modeType ) { | Descriptor |
|---|---|
| … | |
| if( cu_cbf ) { | |
| … | |
| lfnstHeight = ( treeType = = DUAL_TREE_CHROMA ) ? cbHeight / SubHeightC : ( ( IntraSubPartitionsSplitType = = ISP_HOR_SPLIT) ? cbHeight / NumIntraSubPartitions : cbHeight ) | |
| if( Min( lfnstWidth, lfnstHeight ) >= 4 && sps_lfnst_enabled_flag = = 1 && CuPredMode[ chType ][ x0 ][ y0 ] = = MODE_INTRA && ( !intra_mip_flag[ x0 ][ y0 ] \|\| Min( lfnstWidth, lfnstHeight ) >= 16 \|\| intra_subpartitions_mode_flag) && Max( cbWidth, cbHeight ) <= MaxTbSizeY) { | |
| if( ( IntraSubPartitionsSplitType != ISP_NO_SPLIT \| \| LfnstDcOnly = = 0 ) && LfnstZeroOutSigCoeffFlag = = 1 ) | |
| **lfnst_idx** | ae(v) |
| } | |
| … | |
| } | |
| | |

Figure 21

| coding_unit( x0, y0, cbWidth, cbHeight, cqtDepth, treeType, modeType ) { | **Descriptor** |
|---|---|
| … | |
| if( CuPredMode[ chType ][ x0 ][ y0 ] = = MODE_INTRA && sps_act_enabled_flag && treeType = = SINGLE_TREE ) | |
| **cu_act_enabled_flag** | ae(v) |
| if( CuPredMode[ chType ][ x0 ][ y0 ] = = MODE_INTRA \| \| CuPredMode[ chType ][ x0 ][ y0 ] = = MODE_PLT ) { | |
| if( treeType = = SINGLE_TREE \| \| treeType = = DUAL_TREE_LUMA ) { | |
| if( pred_mode_plt_flag ) { | |
| palette_coding( x0, y0, cbWidth, cbHeight, treeType ) | |
| } else { | |
| if( sps_bdpcm_enabled_flag && cbWidth <= MaxTsSize && cbHeight <= MaxTsSize ) | |
| **intra_bdpcm_luma_flag** | ae(v) |
| if( intra_bdpcm_luma_flag ) | |
| **intra_bdpcm_luma_dir_flag** | ae(v) |
| ~~}~~ else { | |
| if( sps_mrl_enabled_flag && ( ( y0 % CtbSizeY ) > 0 ) ) | |
| **intra_luma_ref_idx**[ x0 ][ y0 ] | ae(v) |
| if( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| **intra_subpartitions_mode_flag**[ x0 ][ y0 ] | ae(v) |
| if( intra_subpartitions_mode_flag[ x0 ][ y0 ] = = 1 ) | |
| **intra_subpartitions_split_flag**[ x0 ][ y0 ] | ae(v) |
| if( sps_mip_enabled_flag && intra_luma_ref_idx[ x0 ][ y0 ] = = 0) | |
| **intra_mip_flag**[ x0 ][ y0 ] | ae(v) |
| if( intra_mip_flag[ x0 ][ y0 ] ) { | |
| If (intra_subpartitions_mode_flag[ x0 ][ y0 ] = = 0){ | |
| **intra_mip_transposed**[ x0 ][ y0 ] | ae(v) |
| } | |
| **intra_mip_mode**[ x0 ][ y0 ] | ae(v) |
| } | |
| … | |
| } | |
| } | |

Figure 22

| |
|---|
| coding_unit( x0, y0, cbWidth, cbHeight, cqtDepth, treeType, modeType ) { |
| … |
| if( CuPredMode[ chType ][ x0 ][ y0 ] = = MODE_INTRA && sps_act_enabled_flag && treeType = = SINGLE_TREE ) |
| **cu_act_enabled_flag** |
| if( CuPredMode[ chType ][ x0 ][ y0 ] = = MODE_INTRA \|\| CuPredMode[ chType ][ x0 ][ y0 ] = = MODE_PLT ) { |
| if( treeType = = SINGLE_TREE \|\| treeType = = DUAL_TREE_LUMA ) { |
| if( pred_mode_plt_flag ) { |
| palette_coding( x0, y0, cbWidth, cbHeight, treeType ) |
| } else { |
| if( sps_bdpcm_enabled_flag && cbWidth <= MaxTsSize && cbHeight <= MaxTsSize ) |
| **intra_bdpcm_luma_flag** |
| if( intra_bdpcm_luma_flag ) |
| **intra_bdpcm_luma_dir_flag** |
| } else { |
| if( sps_mrl_enabled_flag && ( ( y0 % CtbSizeY ) > 0 ) ) |
| **intra_luma_ref_idx**[ x0 ][ y0 ] |
| if( sps_mip_enabled_flag && intra_luma_ref_idx[ x0 ][ y0 ] = = 0) |
| **intra_mip_flag**[ x0 ][ y0 ] |
| if( intra_mip_flag[ x0 ][ y0 ] ) { |
| **intra_mip_transposed**[ x0 ][ y0 ] |
| **intra_mip_mode**[ x0 ][ y0 ] |
| } |
| if( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) |
| **intra_subpartitions_mode_flag**[ x0 ][ y0 ] |
| if( intra_subpartitions_mode_flag[ x0 ][ y0 ] = = 1 && **intra_mip_flag**[ x0 ][ y0 ] == 0) |
| **intra_subpartitions_split_flag**[ x0 ][ y0 ] |
| … |
| } |
| } |
| } |
| } |

Figure 23

| coding_unit( x0, y0, cbWidth, cbHeight, cqtDepth, treeType, modeType ) { | Descriptor |
|---|---|
| … | |
| if( CuPredMode[ chType ][ x0 ][ y0 ] = = MODE_INTRA && sps_act_enabled_flag && treeType = = SINGLE_TREE ) | |
| cu_act_enabled_flag | ae(v) |
| if( CuPredMode[ chType ][ x0 ][ y0 ] = = MODE_INTRA \| \| CuPredMode[ chType ][ x0 ][ y0 ] = = MODE_PLT ) { | |
| if( treeType = = SINGLE_TREE \| \| treeType = = DUAL_TREE_LUMA ) { | |
| if( pred_mode_plt_flag ) { | |
| palette_coding( x0, y0, cbWidth, cbHeight, treeType ) | |
| } else { | |
| if( sps_bdpcm_enabled_flag && cbWidth <= MaxTsSize && cbHeight <= MaxTsSize ) | |
| intra_bdpcm_luma_flag | ae(v) |
| if( intra_bdpcm_luma_flag ) | |
| intra_bdpcm_luma_dir_flag | ae(v) |
| else { | |
| if( sps_mrl_enabled_flag && ( ( y0 % CtbSizeY ) > 0 ) ) | |
| intra_luma_ref_idx[ x0 ][ y0 ] | ae(v) |
| if( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| intra_subpartitions_mode_flag[ x0 ][ y0 ] | ae(v) |
| if( intra_subpartitions_mode_flag[ x0 ][ y0 ] = = 1 ) | |
| intra_subpartitions_split_flag[ x0 ][ y0 ] | ae(v) |
| if( sps_mip_enabled_flag && intra_luma_ref_idx[ x0 ][ y0 ] = = 0) | |
| intra_mip_flag[ x0 ][ y0 ] | ae(v) |
| if( intra_mip_flag[ x0 ][ y0 ] ) { | |
| intra_mip_mode[ x0 ][ y0 ] | ae(v) |
| If (intra_subpartitions_mode_flag[ x0 ][ y0 ] = = 0){ | |
| intra_mip_transposed[ x0 ][ y0 ] | ae(v) |
| } | |
| } | |
| … | |
| } | |
| } | |
| } | |

Figure 24

| coding_unit( x0, y0, cbWidth, cbHeight, cqtDepth, treeType, modeType ) { | **Descriptor** |
|---|---|
| .... | |
| if( CuPredMode[ chType ][ x0 ][ y0 ] = = MODE_INTRA \| \| CuPredMode[ chType ][ x0 ][ y0 ] = = MODE_PLT ) { | |
| if(treeType = = SINGLE_TREE \| \| treeType = = DUAL_TREE_LUMA ) { | |
| if( pred_mode_plt_flag ) { | |
| palette_coding( x0, y0, cbWidth, cbHeight, treeType ) | |
| } else { | |
| if( sps_bdpcm_enabled_flag && cbWidth <= MaxTsSize && cbHeight <= MaxTsSize ) | |
| **intra_bdpcm_luma_flag** | ae(v) |
| if( intra_bdpcm_luma_flag ) | |
| **intra_bdpcm_luma_dir_flag** | ae(v) |
| else { | |
| if( sps_mip_enabled_flag ) | |
| **intra_mip_flag**[ x0 ][ y0 ] | ae(v) |
| if( intra_mip_flag[ x0 ][ y0 ] ) { | |
| **intra_mip_transposed**[ x0 ][ y0 ] | ae(v) |
| **intra_mip_mode**[ x0 ][ y0 ] | ae(v) |
| } else { | |
| if( sps_mrl_enabled_flag && ( ( y0 % CtbSizeY ) > 0 ) ) | |
| **intra_luma_ref_idx**[ x0 ][ y0 ] | ae(v) |
| if( sps_isp_enabled_flag && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| **intra_subpartitions_mode_flag**[ x0 ][ y0 ] | ae(v) |
| if( intra_subpartitions_mode_flag[ x0 ][ y0 ] = = 1 ) | |
| **intra_subpartitions_split_flag**[ x0 ][ y0 ] | ae(v) |
| if( intra_luma_ref_idx[ x0 ][ y0 ] = = 0 ) | |
| **intra_luma_mpm_flag**[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| **intra_luma_not_planar_flag**[ x0 ][ y0 ] | ae(v) |
| if( intra_luma_not_planar_flag[ x0 ][ y0 ] ) | |
| **intra_luma_mpm_idx**[ x0 ][ y0 ] | ae(v) |
| } else | |
| **intra_luma_mpm_remainder**[ x0 ][ y0 ] | ae(v) |
| } | |
| .... | |

Figure 29

| coding_unit( x0, y0, cbWidth, cbHeight, cqtDepth, treeType, modeType ) { | Descriptor |
|---|---|
| … | |
| if( CuPredMode[ chType ][ x0 ][ y0 ] = = MODE_INTRA && sps_act_enabled_flag && treeType = = SINGLE_TREE ) | |
| cu_act_enabled_flag | ae(v) |
| if( CuPredMode[ chType ][ x0 ][ y0 ] = = MODE_INTRA \| \| CuPredMode[ chType ][ x0 ][ y0 ] = = MODE_PLT ) { | |
| if( treeType = = SINGLE_TREE \| \| treeType = = DUAL_TREE_LUMA ) { | |
| if( pred_mode_plt_flag ) { | |
| palette_coding( x0, y0, cbWidth, cbHeight, treeType ) | |
| } else { | |
| if( sps_bdpcm_enabled_flag && cbWidth <= MaxTsSize && cbHeight <= MaxTsSize ) | |
| intra_bdpcm_luma_flag | ae(v) |
| if( intra_bdpcm_luma_flag ) | |
| intra_bdpcm_luma_dir_flag | ae(v) |
| else { | |
| if( sps_mip_enabled_flag ) | |
| intra_mip_flag[ x0 ][ y0 ] | ae(v) |
| if( intra_mip_flag[ x0 ][ y0 ] ) { | |
| intra_mip_transposed[ x0 ][ y0 ] | ae(v) |
| intra_mip_mode[ x0 ][ y0 ] | ae(v) |
| } | |
| if( sps_mrl_enabled_flag && ( ( y0 % CtbSizeY ) > 0 ) ) | |
| intra_luma_ref_idx[ x0 ][ y0 ] | ae(v) |
| if( sps_isp_enabled_flag && ( cbWidth <= MaxTbSizeY && cbHeight <= MaxTbSizeY ) && ( cbWidth * cbHeight > MinTbSizeY * MinTbSizeY ) && !cu_act_enabled_flag ) | |
| intra_subpartitions_mode_flag[ x0 ][ y0 ] | ae(v) |
| if( intra_subpartitions_mode_flag[ x0 ][ y0 ] = = 1 ) | |
| intra_subpartitions_split_flag[ x0 ][ y0 ] | ae(v) |
| … | |
| } | |
| } | |
| } | |

Figure 31

8.7.4 Transformation process for scaled transform coefficients
8.7.4.1 General
Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array res[ x ][ y ] of residual samples with x = 0..nTbW − 1, y = 0..nTbH − 1.

...

The variable implicitMtsEnabled is derived as follows:
- If sps_mts_enabled_flag is equal to 1 and one of the following conditions is true, implicitMtsEnabled is set equal to 1:
- IntraSubPartitionsSplitType is not equal to ISP_NO_SPLIT and intra_luma_ref_idx [ xTbComp ][ yTbComp ] is equal to zero
- ...

- Otherwise, implicitMtsEnabled is set equal to 0.

The variable trTypeHor specifying the horizontal transform kernel and the variable trTypeVer specifying the vertical transform kernel are derived as follows:
- ...

Figure 32

| coding_unit( x0, y0, cbWidth, cbHeight, cqtDepth, treeType, modeType ) { | Descriptor |
|---|---|
| … | |
| if( cu_cbf ) { | |
| … | |
| lfnstWidth = ( treeType = = DUAL_TREE_CHROMA ) ?<br>cbWidth / SubWidthC : (<br>( IntraSubPartitionsSplitType = = ISP_VER_SPLIT ) ?<br>cbWidth / NumIntraSubPartitions : cbWidth<br>) | |
| lfnstHeight = ( treeType = = DUAL_TREE_CHROMA ) ?<br>cbHeight / SubHeightC : (<br>( IntraSubPartitionsSplitType = = ISP_HOR_SPLIT) ?<br>cbHeight / NumIntraSubPartitions : cbHeight<br>) | |
| … | |
| if( treeType != DUAL_TREE_CHROMA<br>&& lfnst_idx = = 0<br>&& transform_skip_flag[ x0 ][ y0 ][ 0 ] = = 0<br>&& Max( cbWidth, cbHeight ) <= 32<br>&& Min(lfnstWidth, lfnstHeight) >= 4<br>&& (IntraSubPartitionsSplit[ x0 ][ y0 ] = = ISP_NO_SPLIT \|\|<br>intra_mip_flag[ x0 ][ y0 ] > 0)<br>&& cu_sbt_flag = = 0<br>&& MtsZeroOutSigCoeffFlag = = 1<br>&& tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \| \| (<br>CuPredMode[ chType ][ x0 ][ y0 ] = = MODE_INTRA &&<br>sps_explicit_mts_intra_enabled_flag ) ) ) | |
| mts_idx | ae(v) |
| } | |
| } | |

Figure 33

8.7.4 Transformation process for scaled transform coefficients
8.7.4.1 General
Inputs to this process are:
– a luma location ( xTbY, yTbY ) specifying the top-left sample of the current luma transform block
relative to the top-left luma sample of the current picture,
– a variable nTbW specifying the width of the current transform block,
– a variable nTbH specifying the height of the current transform block,
– a variable cIdx specifying the colour component of the current block,
– an (nTbW)x(nTbH) array d[ x ][ y ] of scaled transform coefficients with x = 0..nTbW − 1, y = 0..nTbH − 1.

Output of this process is the (nTbW)x(nTbH) array res[ x ][ y ] of residual samples with x = 0..nTbW − 1, y = 0..nTbH − 1.
...
The variable implicitMtsEnabled is derived as follows:
– If sps_mts_enabled_flag is equal to 1 and one of the following conditions is true,
implicitMtsEnabled is set equal to 1:
– IntraSubPartitionsSplitType is not equal to ISP_NO_SPLIT and
intra_luma_ref_idx[ xTbComp ][ yTbComp ] is equal to 0
– ...
– Otherwise, implicitMtsEnabled is set equal to 0.
The variable trTypeHor specifying the horizontal transform kernel and the variable trTypeVer specifying the vertical transform kernel are derived as follows:

Figure 34

8.7.4 Transformation process for scaled transform coefficients

8.7.4.1 General

Inputs to this process are:

– a luma location ( xTbY, yTbY ) specifying the top-left sample of the current luma transform block relative to the top-left luma sample of the current picture, – a variable nTbW specifying the width of the current transform block, – a variable nTbH specifying the height of the current transform block, – a variable cIdx specifying the colour component of the current block, – an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

...

The variable implicitMtsEnabled is derived as follows:

– If sps_mts_enabled_flag is equal to 1 and one of the following conditions is true, implicitMtsEnabled is set equal to 1:

– IntraSubPartitionsSplitType is not equal to ISP_NO_SPLIT and sps_explicit_mts_intra_enabled_flag equals to zero – cu_sbt_flag is equal to 1 and Max( nTbW, nTbH ) is less than or equal to 32

– sps_explicit_mts_intra_enabled_flag is equal to 0 and CuPredMode[ 0 ][ xTbY ][ yTbY ] is equal to MODE_INTRA and lfnst_idx[ x0 ][ y0 ] is equal to 0 and intra_mip_flag[ x0 ][ y0 ] is equal to 0

– Otherwise, implicitMtsEnabled is set equal to 0.

The variable trTypeHor specifying the horizontal transform kernel and the variable trTypeVer specifying the vertical transform kernel are derived as follows:

– If cIdx is greater than 0, trTypeHor and trTypeVer are set equal to 0.

– Otherwise, if implicitMtsEnabled is equal to 1, the following applies:

– If IntraSubPartitionsSplitType is not equal to ISP_NO_SPLIT or sps_explicit_mts_intra_enabled_flag is equal to 0 and CuPredMode[ 0 ][ xTbY ][ yTbY ] is equal to MODE_INTRA, trTypeHor and trTypeVer are derived as follows:

trTypeHor = ( nTbW >= 4 && nTbW <= 16 ) ? 1 : 0 (8-975)

trTypeVer = ( nTbH >= 4 && nTbH <= 16 ) ? 1 : 0 (8-976)

– Otherwise (cu_sbt_flag is equal to 1), trTypeHor and trTypeVer are specified in Table 8-15 depending on cu_sbt_horizontal_flag and cu_sbt_pos_flag.

– Otherwise, trTypeHor and trTypeVer are specified in Table 8-14 depending on tu_mts_idx[ xTbY ][ yTbY ].

Figure 35

8.7.4 Transformation process for scaled transform coefficients

8.7.4.1 General

Inputs to this process are:

- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

...

The variable implicitMtsEnabled is derived as follows:

- If sps_mts_enabled_flag is equal to 1 and one of the following conditions is true, implicitMtsEnabled is set equal to 1:
- IntraSubPartitionsSplitType is not equal to ISP_NO_SPLIT and sps_explicit_mts_isp_flag equals to one
- cu_sbt_flag is equal to 1 and Max( nTbW, nTbH ) is less than or equal to 32
- sps_explicit_mts_intra_enabled_flag is equal to 0 and CuPredMode[ 0 ][ xTbY ][ yTbY ] is equal to MODE_INTRA and lfnst_idx[ x0 ][ y0 ] is equal to 0 and intra_mip_flag[ x0 ][ y0 ] is equal to 0
- Otherwise, implicitMtsEnabled is set equal to 0.

The variable trTypeHor specifying the horizontal transform kernel and the variable trTypeVer specifying the vertical transform kernel are derived as follows:

- If cIdx is greater than 0, trTypeHor and trTypeVer are set equal to 0.
- Otherwise, if implicitMtsEnabled is equal to 1, the following applies:
- If IntraSubPartitionsSplitType is not equal to ISP_NO_SPLIT or sps_explicit_mts_intra_enabled_flag is equal to 0 and CuPredMode[ 0 ][ xTbY ][ yTbY ] is equal to MODE_INTRA, trTypeHor and trTypeVer are derived as follows:

trTypeHor = ( nTbW >= 4 && nTbW <= 16 ) ? 1 : 0 (8-975)

trTypeVer = ( nTbH >= 4 && nTbH <= 16 ) ? 1 : 0 (8-976)

- Otherwise (cu_sbt_flag is equal to 1), trTypeHor and trTypeVer are specified in Table 8-15 depending on cu_sbt_horizontal_flag and cu_sbt_pos_flag.
- Otherwise, trTypeHor and trTypeVer are specified in Table 8-14 depending on tu_mts_idx[ xTbY ][ yTbY ].

Figure 36

INTRA SUB PARTITIONS FOR VIDEO ENCODING AND DECODING COMBINED WITH MULTIPLE TRANSFORM SELECTION, MATRIX WEIGHTED INTRA PREDICTION OR MULTI-REFERENCE-LINE INTRA PREDICTION

CROSS REFERENCE TO RELATED APPLICATIONS

This application is a U.S. National Stage Application under 35 U.S.C. 371 of International Patent Application No. PCT/EP2020/083826, filed Nov. 30, 2020, which is incorporated herein by reference in its entirety.

This application claims the benefit of European Application Nos. 19306575.2, filed Dec. 5, 2019; 19306576.0, filed Dec. 5, 2019; and 19306577.8, filed Dec. 5, 2019, each of which is incorporated herein by reference in its entirety.

TECHNICAL FIELD

At least one of the present embodiments generally relates to the field of video compression. Embodiments aim at adapting some coding techniques to an Intra Sub Partition mode in which a coding unit is split in multiple sub partitions. At least one embodiment particularly aims at the selection of primary transforms among a set of multiple transforms for video encoding or decoding of intra sub block partitions. At least one embodiment particularly aims at intra coding using Matrix-Based Intra Prediction mode combined with Intra Sub Partition mode. At least one embodiment particularly aims at intra coding using Multi-Reference-Line intra prediction mode combined with Intra Sub Partition mode.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

One or more of the present embodiments relates to the selection of the pair of transforms for a transform unit in a coding unit coded in intra sub partition mode, thus split in multiple sub partitions and relates also to the signaling of the selected pair of transforms.

One or more of the present embodiments relates to using Matrix-Based Intra Prediction for blocks coded using the Intra Sub Partition mode. This allows to improve compression efficiency of the video codec. In other words, it allows to encode, signal and decode blocks for which the intra prediction splits a block into multiple sub blocks and where the prediction for the sub blocks is using matrix based intra prediction where a 2D matrix and 1D vector is applied to a vector based on the column of reconstructed reference samples on the left of the block and the line of reconstructed reference samples on top of the current block.

Various embodiments relate to a video coding system comprising an intra prediction mode where a block of an image of the video is split into multiple sub partitions and samples of the sub partitions are predicted based on a reference line comprising reference samples, the reference line being selected among multiple reference lines.

One or more of the present embodiments relates to using Multiple Reference Lines Intra Prediction for blocks coded using the Intra Sub Partition mode. This improves the compression efficiency of the video codec. In other words, it allows to encode, signal, and decode blocks for which the intra prediction splits a block into multiple equal-sized sub-blocks while allowing each sub-block to be predicted based on any one of the multiple reference lines available.

According to a first aspect of at least one embodiment, a video encoding method comprises splitting an obtained block of a video into sub partitions, applying a coding tool on samples of the sub partitions, and encoding the block and signaling information, wherein the signaling information comprises at least an information representative of coding tool and associated parameters, and wherein the coding tool either applies a transform to the sub partitions based on a set of transforms or performs intra prediction by applying a 2D matrix and 1D vector to reconstructed neighbors of the block or performs intra prediction by predicting samples of the sub partitions based on a reference line comprising reference samples, the reference line being selected among multiple reference lines.

According to a second aspect of at least one embodiment, a video encoding method comprises obtaining a block of video and signaling information representative of a coding tool and associated parameters, splitting the obtained block of a video into sub partitions, applying a coding tool on samples of the sub partitions, and decoding the block, wherein the coding tool either applies an inverse transform to the sub partitions based on a set of transforms or performs intra prediction by applying a 2D matrix and 1D vector to reconstructed neighbors of the block or performs intra prediction by predicting samples of the sub partitions based on a reference line comprising reference samples, the reference line being selected among multiple reference lines.

According to a third aspect of at least one embodiment, a video encoding apparatus comprises an encoder configured to split an obtained block of a video into sub partitions, apply a coding tool on samples of the sub partitions, and encode the block and signaling information, wherein the signaling information comprises at least an information representative of coding tool and associated parameters, wherein the coding tool either applies a transform to the sub partitions based on a set of transforms or performs intra prediction by applying a 2D matrix and 1D vector to reconstructed neighbors of the block or performs intra prediction by predicting samples of the sub partitions based on a reference line comprising reference samples, the reference line being selected among multiple reference lines.

According to a fourth aspect of at least one embodiment, a video decoding apparatus comprises a decoder configured to obtain a block of video and signaling information representative of a coding tool and associated parameters, split the obtained block of a video into sub partitions, apply an inverse coding tool on samples of the sub partitions, and decode the block, wherein the coding tool either applies a transform to the sub partitions based on a set of transforms or performs intra prediction by applying a 2D matrix and 1D vector to reconstructed neighbors of the block or performs intra prediction by predicting samples of the sub partitions based on a reference line comprising reference samples, the reference line being selected among multiple reference lines.

According to a fifth aspect of at least one embodiment, a signal comprises a coding a block of a video comprising information representative of coding tool and associated parameters, wherein the coding tool either applies a transform to the sub partitions based on a set of transforms or performs intra prediction by applying a 2D matrix and 1D vector to reconstructed neighbors of the block or performs intra prediction by predicting samples of the sub partitions based on a reference line comprising reference samples, the reference line being selected among multiple reference lines.

According to a sixth aspect of at least one embodiment, a computer program comprising program code instructions executable by a processor is presented, the computer program implementing the steps of a method according to at least the first or second aspect.

According to a seventh aspect of at least one embodiment, a computer program product which is stored on a non-transitory computer readable medium and comprises program code instructions executable by a processor is presented, the computer program product implementing the steps of a method according to at least the first or second aspect.

BRIEF DESCRIPTION OF THE DRAWINGS

FIG. 10 illustrates a first example of transform process according to at least an embodiment.

FIG. 11 illustrates a second example of transform process according to at least an embodiment.

FIG. 14 illustrates a first example embodiment of coding unit syntax enabling the combination of MIP and ISP.

FIG. 15 illustrates a second example embodiment of coding unit syntax enabling the combination of MIP and ISP.

FIG. 16 illustrates a third example embodiment of coding unit syntax enabling the combination of MIP and ISP.

FIG. 17 illustrates a fourth example embodiment of coding unit syntax enabling the combination of MIP and ISP.

FIG. 18 illustrates the transformation process for deriving the implicitMtsEnabled flag for an embodiment using the second method of transform selection.

FIG. 19 illustrates an extract of the coding unit syntax for an embodiment using the third method of transform selection.

FIG. 20 illustrates the transformation process for deriving the implicitMtsEnabled flag for an embodiment using the fourth method of transform selection.

FIG. 21 illustrates the corresponding syntax change for an embodiment using Low-Frequency Non-Separable Transform.

FIG. 22 illustrates an extract of the coding unit syntax for an embodiment that removes the MIP transposed flag.

FIG. 23 illustrates an extract of the coding unit syntax for an embodiment wherein ISP split direction is deduced when MIP is combined with ISP.

FIG. 24 illustrates an extract of the coding unit syntax for an embodiment implicitly selecting MIP mode if MIP-ISP combination is used.

FIG. 29 illustrates an example embodiment of coding unit syntax enabling the combination of MRL and ISP.

FIG. 31 illustrates an example syntax for an embodiment using multi reference line intra prediction system in an intra sub partition coded coding unit using matrix-based intra prediction.

FIG. 32 illustrates the derivation process to determine the implicitMTS variable according to a second method.

FIG. 33 illustrates an example of coding according to a third method.

FIG. 34 illustrates the derivation process to determine the implicitMTS variable according to the third method.

FIG. 35 illustrates a first example of transform process according to at least an embodiment.

FIG. 36 illustrates a second example of transform process according to at least an embodiment.

DETAILED DESCRIPTION

Various embodiments relate to the use of multiple transforms selection for video encoding or decoding of intra sub block partitions. Various methods and other aspects described in this application can be used for signaling and selection of the transform to be used according to various parameters.

Moreover, the present aspects, although describing principles related to particular drafts of VVC (Versatile Video Coding according to draft 7 for example) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Figure 1:
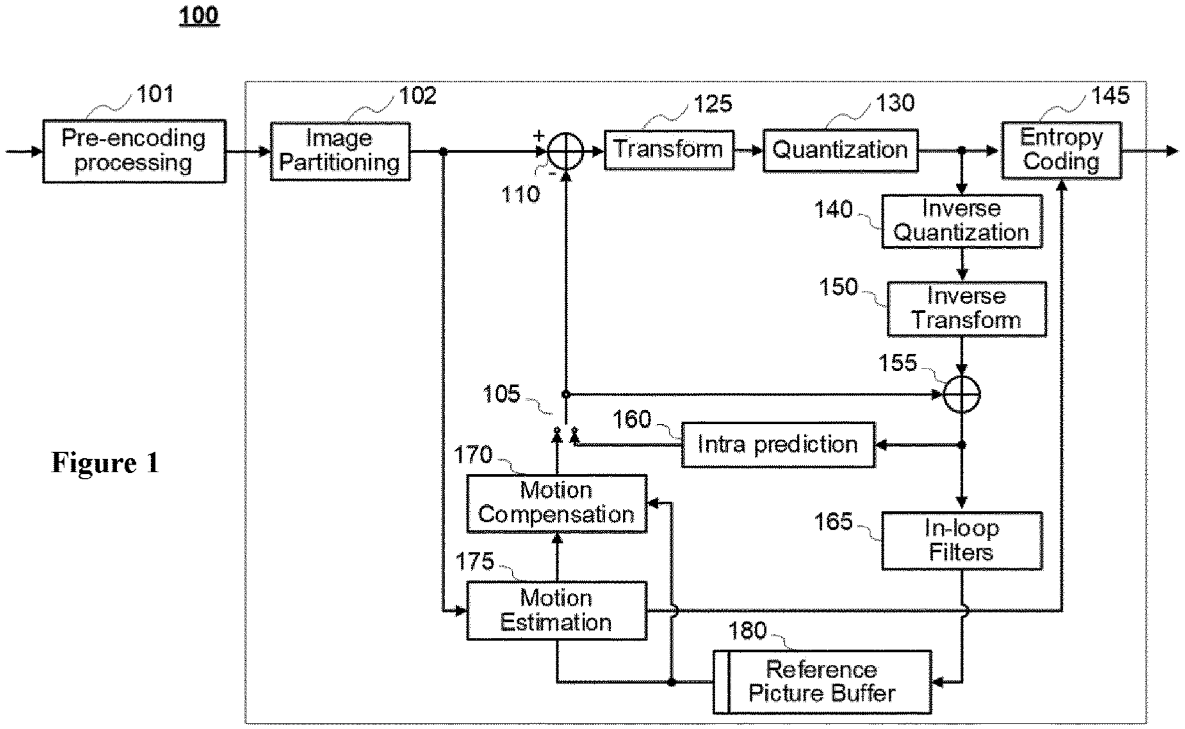
FIG. 1 illustrates a block diagram of an example of video encoder 100.

FIG. 1 illustrates block diagram of an example of video encoder 100, such as a HEVC encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team) for VVC according to draft 7 for example.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the example of encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of six most probable modes (MPM), the mode is signaled by an index in the MPM list. Otherwise, the mode is signaled by a fixed-length binarization of the mode index. The six most probable modes are derived from the intra prediction modes of the top and left neighboring blocks (see TABLE 1 below).

TABLE 1

| Conditions | | MPM[0] | MPM[1] | MPM[2] | MPM[3] | MPM[4] | MPM[5] |
|---|---|---|---|---|---|---|---|
| L = A | L ≠ PLANAR_IDX and L ≠ DC_IDX | PLANAR_IDX | L | L − 1 | L + 1 | DC_IDX | L − 2 |
| | Otherwise | PLANAR_IDX | DC_IDX | VER_IDX | HOR_IDX | VER_IDX − 4 | VER_IDX + 4 |
| L ≠ A | L > DC_IDX and A > DC_IDX | PLANAR_IDX | L | A | DC_IDX | Max(L, A) − 2, if L and A are adjacent else max (L, A) − 1 | Max(L, A) + 2, if L and A are adjacent else max (L, A) + 1 |
| | Otherwise L + A >= 2 | PLANAR_IDX | Max(L, A) | DC_IDX | Max(L, A) − 1 | Max(L, A) + 1 | Max(L, A) − 2 |
| | otherwise | PLANAR_IDX | DC_IDX | VER_IDX | HOR_IDX | VER_IDX − 4 | VER_IDX + 4 |

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured For an inter CU, The motion information (for example, motion vector and reference picture index) can be signaled in multiple methods, for example "merge mode" or "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the CU syntax for AMVP.

For each coding unit, the video encoder performs a rate-distortion optimization step that measures exhaustively the encoding performances for the different modes and selects one of the modes (generally the mode that provides the best encoding performances for the coding unit).

The prediction residuals are then transformed (125) and quantized (130), including at least one embodiment for adapting the chroma quantization parameter described below. The transforms are generally based on separable transforms. For example, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
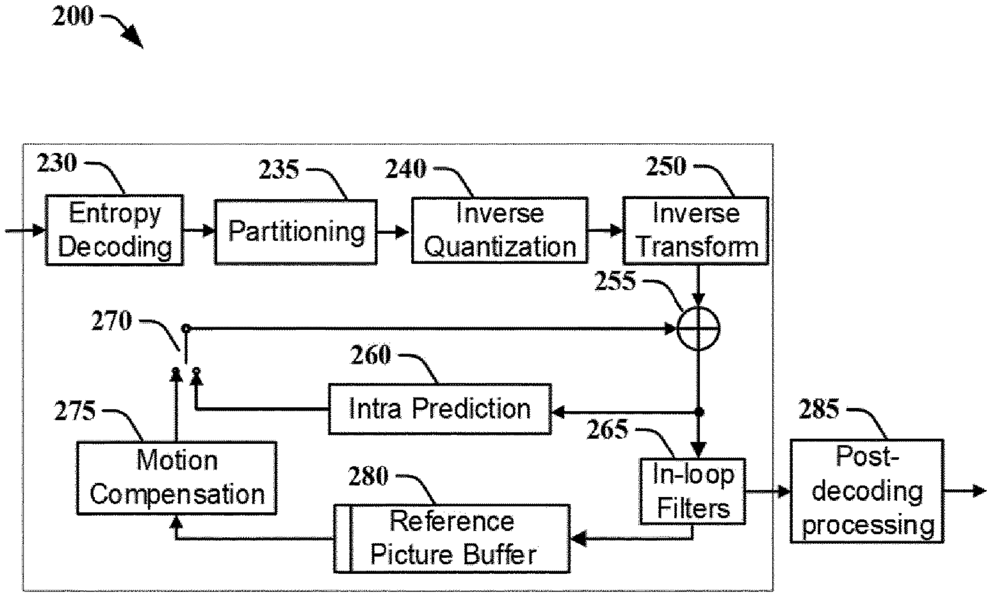
FIG. 2 illustrates a block diagram of an example of video decoder 200.

FIG. 2 illustrates a block diagram of an example of video decoder 200, such as an HEVC decoder. In the example of decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
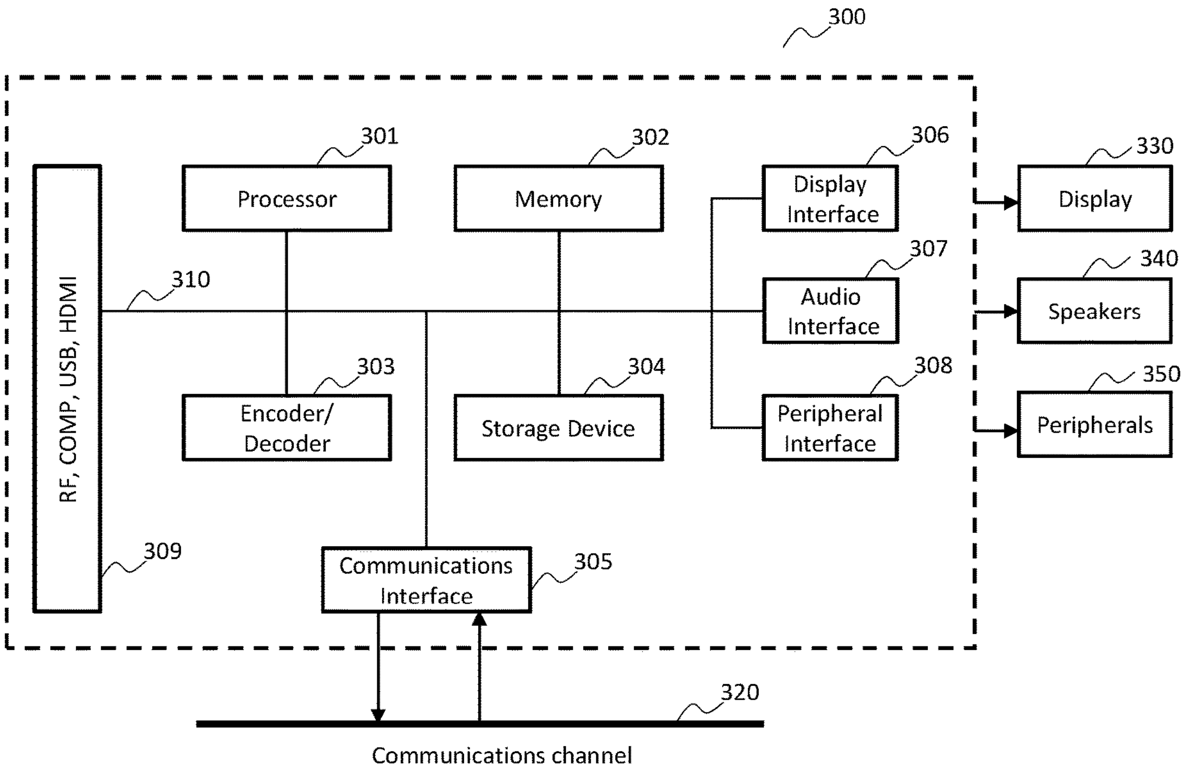
FIG. 3 illustrates a block diagram of an example of a system in which various aspects and embodiments are implemented.

FIG. 3 illustrates a block diagram of an example of a system in which various aspects and embodiments are implemented. System 300 can be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 300, singly or in combination, can be embodied in a single integrated circuit, multiple ICs, and/or discrete components. For example, in at least one embodiment, the processing and encoder/decoder elements of system 300 are distributed across multiple ICs and/or discrete components. In various embodiments, the elements of system 300 are communicatively coupled through an internal bus 310. In various embodiments, the system 300 is communicatively coupled to other similar systems, or to other electronic devices, via, for example, a communications bus or through dedicated input and/or output ports. In various embodiments, the system 300 is configured to implement one or more of the aspects described in this document, such as the video encoder 100 and video decoder 200 described above and modified as described below.

The system 300 includes at least one processor 301 configured to execute instructions loaded therein for implementing, for example, the various aspects described in this document. Processor 301 can include embedded memory, input output interface, and various other circuitries as known in the art. The system 300 includes at least one memory 302 (e.g., a volatile memory device, and/or a non-volatile memory device). System 300 includes a storage device 304, which can include non-volatile memory and/or volatile memory, including, but not limited to, EEPROM, ROM, PROM, RAM, DRAM, SRAM, flash, magnetic disk drive, and/or optical disk drive. The storage device 304 can include an internal storage device, an attached storage device, and/or a network accessible storage device, as non-limiting examples.

System 300 includes an encoder/decoder module 303 configured, for example, to process data to provide an encoded video or decoded video, and the encoder/decoder module 303 can include its own processor and memory. The encoder/decoder module 303 represents module(s) that can be included in a device to perform the encoding and/or decoding functions. As is known, a device can include one or both of the encoding and decoding modules. Additionally, encoder/decoder module 303 can be implemented as a separate element of system 300 or can be incorporated within processor 301 as a combination of hardware and software as known to those skilled in the art.

Program code to be loaded onto processor 301 or encoder/decoder 303 to perform the various aspects described in this document can be stored in storage device 304 and subsequently loaded onto memory 302 for execution by processor 301. In accordance with various embodiments, one or more of processor 301, memory 302, storage device 304, and encoder/decoder module 303 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 301 and/or the encoder/decoder module 303 is used to store instructions and to provide working memory for processing that is needed during encoding or decoding. In other embodiments, however, a memory external to the processing device (for example, the processing device can be either the processor 301 or the encoder/decoder module 303) is used for one or more of these functions. The external memory can be the memory 302 and/or the storage device 304, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 300 can be provided through various input devices as indicated in block 309. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 309 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 300 to other electronic devices across USB and/or HDMI connections. It is to be understood that various aspects of input processing, for example, Reed-Solomon error correction, can be implemented, for example, within a separate input processing IC or within processor 301 as necessary. Similarly, aspects of USB or HDMI interface processing can be implemented within separate interface ICs or within processor 301 as necessary. The demodulated, error corrected, and demultiplexed stream is provided to various processing elements, including, for example, processor 301, and encoder/decoder 303 operating in combination with the memory and storage elements to process the data-stream as necessary for presentation on an output device.

Various elements of system 300 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 300 includes communication interface 305 that enables communication with other devices via communication channel 320. The communication interface 305 can include, but is not limited to, a transceiver configured to transmit and to receive data over communication channel 320. The communication interface 305 can include, but is not limited to, a modem or network card and the communication channel 320 can be implemented, for example, within a wired and/or a wireless medium.

Data is streamed to the system 300, in various embodiments, using a Wi-Fi network such as IEEE 802.11. The Wi-Fi signal of these embodiments is received over the communications channel 320 and the communications interface 305 which are adapted for Wi-Fi communications. The communications channel 320 of these embodiments is typically connected to an access point or router that provides access to outside networks including the Internet for allowing streaming applications and other over-the-top communications. Other embodiments provide streamed data to the system 300 using a set-top box that delivers the data over the HDMI connection of the input block 309. Still other embodiments provide streamed data to the system 300 using the RF connection of the input block 309.

The system 300 can provide an output signal to various output devices, including a display 330, speakers 340, and other peripheral devices 350. The other peripheral devices 350 include, in various examples of embodiments, one or more of a stand-alone DVR, a disk player, a stereo system, a lighting system, and other devices that provide a function based on the output of the system 300. In various embodiments, control signals are communicated between the system 300 and the display 330, speakers 340, or other peripheral devices 350 using signaling such as AV.Link, CEC, or other communications protocols that enable device-to-device control with or without user intervention. The output devices can be communicatively coupled to system 300 via dedicated connections through respective interfaces 306, 307, and 308. Alternatively, the output devices can be connected to system 300 using the communications channel 320 via the communications interface 305. The display 330 and speakers 340 can be integrated in a single unit with the other components of system 300 in an electronic device such as, for example, a television. In various embodiments, the display interface 306 includes a display driver, such as, for example, a timing controller (T Con) chip.

The display 330 and speakers 340 can alternatively be separate from one or more of the other components, for example, if the RF portion of input 309 is part of a separate set-top box. In various embodiments in which the display 330 and speakers 340 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Figures 4, 5:
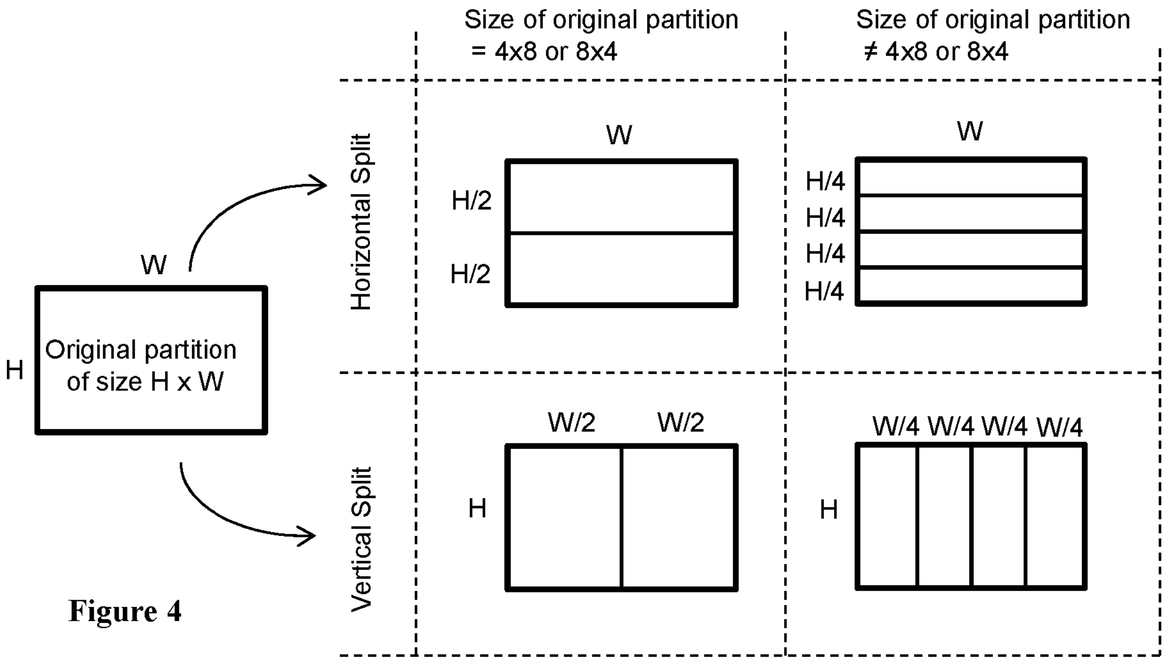
FIG. 4 illustrates an example of possible intra sub partition (ISP) mode.
FIG. 5 illustrates an example of pre-defined pair of transforms used in ISP mode.

FIG. 4 illustrates an example of intra sub partition (ISP) mode. The ISP mode is used for intra-prediction and comprises splitting a coding unit into 2 or 4 transform units of same size. This split may be performed horizontally or vertically. The splitting depends on the block size, as shown in TABLE 2. Basically, a 4×4 block cannot be split. A CU of size 4×8 or 8×4 is split into 2 TUs. Other CUs are split into 4 TUs.

TABLE 2

| Block Size (Height × Width) | Number of Sub-Partitions |
|---|---|
| 4 × 4 | Not divided |
| 4 × 8 and 8 × 4 | 2 |
| All other cases | 4 |

Inside a CU coded using ISP mode, TUs are decoded sequentially, and are intra-predicted from TU to TU using the same intra prediction mode, which is signaled at the CU level. Finally, the residual coding is also adapted according to the intra sub-partitions sizes. Indeed, sub-partitions may be of size 1×N, N×1, 2×N or N×2, coding group of size 1×16, 16×1, 2×8 or 8×2 are used in these respective cases.

The ISP coding mode can be signaled, for example, through two successive flags:

The intra_subpartitions_mode_flag indicates the use of ISP mode for a given Intra CU. A value of 0 indicates that the CU is not split, and a value of 1 indicates that the CU is split.

If intra_subpartitions_mode_flag is 1, the intra_subpartitions_split_flag indicates the orientation of the split into intra sub-partition, where 0 indicates a horizontal split and 1 indicates a vertical split, when the splitting direction cannot be directly inferred from the CU size.

Multiple Transform Selection (MTS) uses a 2D pair of transforms to be applied to a transform unit and may be signaled either in explicit MTS or implicit MTS modes. With Explicit MTS the 2D pair of transforms to be used for the considered block is signaled at the block level. With Implicit MTS, the 2D pair of transforms used for the considered block is derived based on some given available information available at the stage where the considered block is being decoded, for example according to block size as illustrated in FIG. 5.

FIG. 5 illustrates an example of pre-defined pair of transforms used in ISP mode. Indeed, when ISP is used for a given intra CU, then a pre-defined pair of transforms is used to code and decode each of the (2 or 4) TUs contained in that CU. The transform pair are chosen as a combination between DCT2 and DST7 and are applied along horizontal or vertical directions according to the dimensions of the transform block. This results in a set of 4 different pairs, which are the different combinations between DCT2 and DST7. The DST7 horizontal transform is used when the TU width is between 4 and 16 included, otherwise DCT2 is used as the horizontal transform. Similarly, the vertical DST7 transform is used in case the TU height is between 4 and 16 included, otherwise DCT2 is used. In other cases, either the DST7×DCT2 or DCT2×DST7 2D separable primary transform is used as shown in the Figure.

Figure 6:
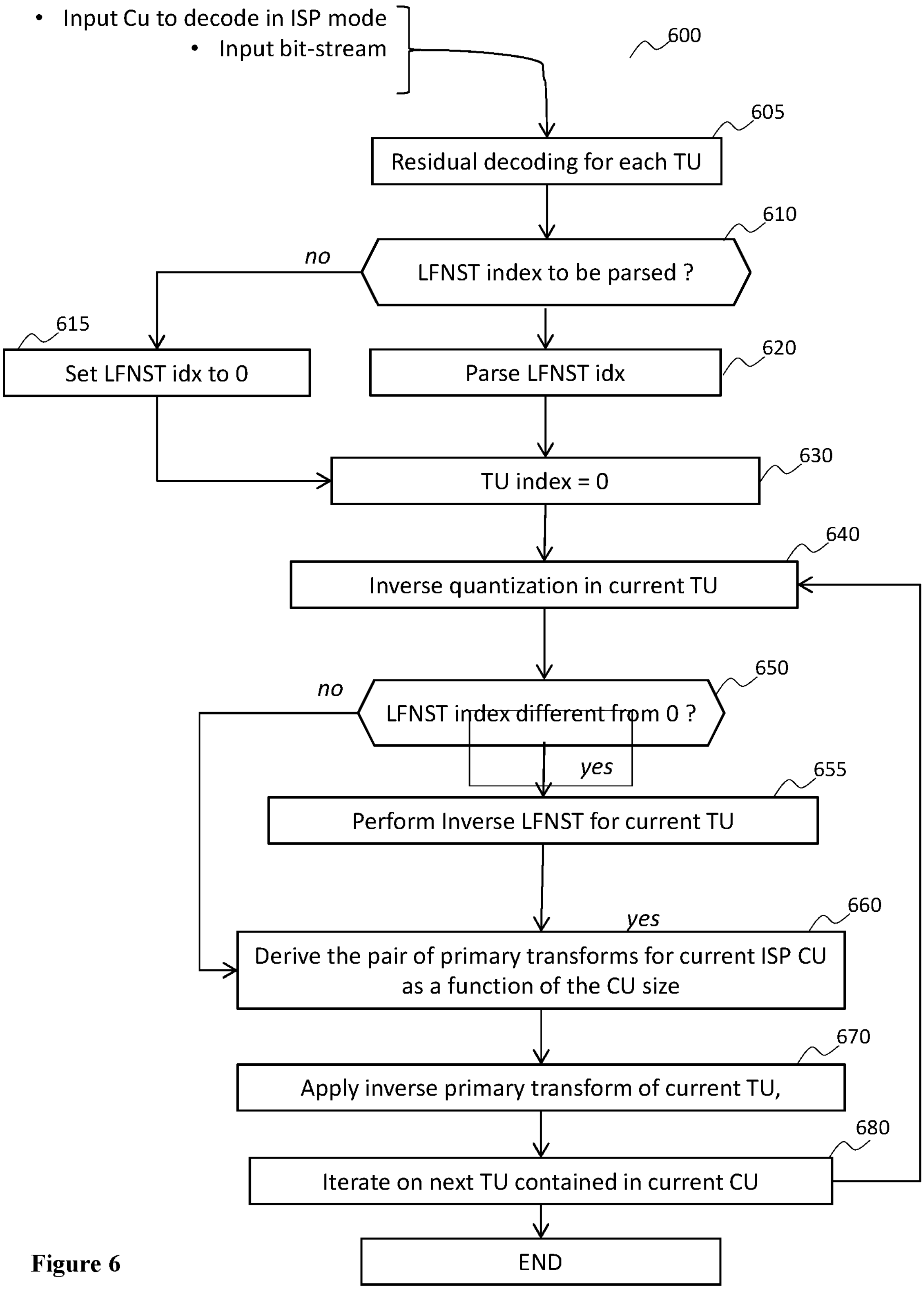
FIG. 6 illustrates an example of parsing and decoding process of a CU's residual data for an intra coding unit coded in ISP mode.

FIG. 6 illustrates the parsing and decoding process of a CU's residual data for an intra coding unit coded in ISP mode. The process includes the entropy decoding of the transform coefficients contained in each TU of the CU, in step 605, followed by the parsing of the LNST index associated to the ISP CU, when it applies in step 620. The parsing stage is followed by a decoding stage, which involves a loop over each TU transform unit, in steps 650 to 680. For each TU, the inverse LFNST is applied to the TU in step 655, with the LFNST index previously decoded at CU level (in step 615 or 620). Next, the 2D primary transform used for the current TU is selected in step 660 according to the implicit MTS mechanism used in ISP coding units as described in previous paragraph and illustrated in FIG. 5. Next the derived 2D primary inverse transform is applied in step 670, providing the residual block associated to the considered TU. The process of FIG. 6 ends when the loop over TUs is completed (test in step 680).

Figure 12:
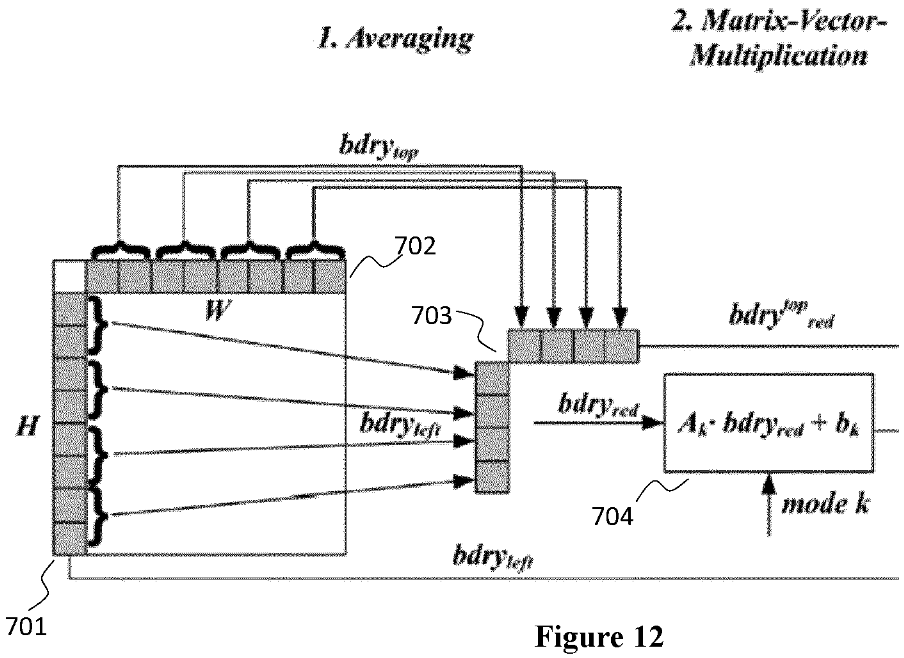
FIGS. 12 and 13 illustrate an example of overall process of the Matrix based Intra Prediction.
Figure 13:
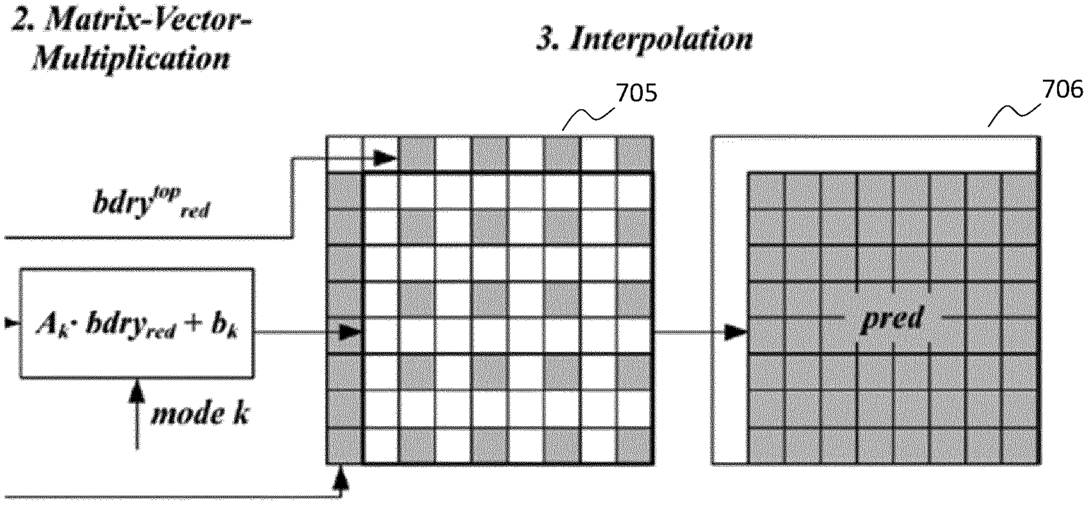

FIGS. 12 and 13 illustrate an example of overall process of the Matrix based Intra Prediction. Matrix-based intra prediction (MIP) is an intra prediction mode comprising a prediction of a block to code based on the column of reconstructed neighbors, for example reference samples on the left of the block (701) and the line of reconstructed reference samples on top of the current block (702). The basic principle of MIP is to predict the current block by putting the top and left reference into a vector. Then this vector, in a sub-sampled version (703), is multiplied by a 2D matrix and a 1D vector is added (704), providing a sub-sampled version of the desired intra-predicted block (705) that is up-sampled to generate the final intra predicted block (706).

In more details, MIP, as described in the FIGS. 12 and 13, may be performed using the 3 following steps:

Step 1: Averaging the reference samples. This first step is performed in order to reduce the number of coefficients to be multiplied. The main motivation for that is to reduce the storage and computation needs by reducing the number of multiplications to be performed as well as the required memory to store all the matrices A_k and vector v_k. The averaging step proceed as follows. Some set of consecutive reference samples on top and on the left of the current block are averaged, leading to 4 averaged reference samples overall in the case of a 4×4 current block, or 8 averaged samples overall in case of other block sizes. The average leads to two reduced vectors $bdry_{red}^{top}$ and $bdry_{red}^{left}$ which are concatenated together to form the 1D vector $bdry_{red}$, made of 4 elements in case of a 4×4 CU, 8 elements otherwise.

Step 2: Matrix vector multiplication. In this operation, the low-resolution version of the precited block matrix is generated by multiplying the reduced reference sample vector $bdry_{red}$, with a specific matrix depending on the signaled intra mode. Thus, the reduced resolution prediction signal $pred_{red}$, is obtained as follows:

$$pred_{red}=A\cdot bdry_{red}+b$$

The 2D size of the reduced resolution predicted signal $pred_{red}$ is equal to the $W_{red}$ and $H_{red}$ in width and height, where:

$$W_{red}=\begin{cases}4 & \text{for } \max(W,H)\le 8\\ \min(W,8) & \text{for } \max(W,H)>8\end{cases}$$

$$H_{red}=\begin{cases}4 & \text{for } \max(W,H)\le 8\\ \min(H,8) & \text{for } \max(W,H)>8\end{cases}$$

where (W,H) is the size of the processed CU. The matrix A has $W_{red}\times H_{red}$ rows and 4 columns if W=H=4 or 8 columns otherwise. The matrix A and the vector b are taken from a set $S_{idx(W,H)}$ where $$idx(W,H)=\begin{cases}0 & \text{for } W=H=4\\ 1 & \text{for } \max(W,H)=8\\ 2 & \text{for } \max(W,H)>8\end{cases}.$$

The set $S_0$ consists of 18 matrices $A_0^i$, $i\in\{0,\ldots,17\}$ each of which has 16 rows and 4 columns and 18 offset vectors $b_0^i$, $i\in\{0,\ldots,17\}$ each of size 16. Matrices and offset vectors of that set are used for blocks of size 4×4. The set $S_1$ consists of 10 matrices $A_1^i$, $i\in\{0,\ldots,9\}$, each of which has 16 rows and 8 columns and 10 offset vectors $b_1^i$, $i\in\{0,\ldots,9\}$ each of size 16. Matrices and offset vectors of that set are used for blocks of sizes 4×8, 8×4 and 8×8. Finally, the set $S_2$ consists of 6 matrices $A_2^i$, $i\in\{0,\ldots,5\}$, each of which has 64 rows and 8 columns and of 6 offset vectors $b_2^i$, $i\in\{0,\ldots,5\}$ of size 64. Matrices and offset vectors of that set or parts of these matrices and offset vectors are used for all other block-shapes.

Step 3: Interpolation: In this final operation, the interpolation operation is performed in order to expand the prediction signal to fill in the prediction buffer. It simply consists of linear interpolation in both vertical and horizontal directions between sub-sampled prediction samples to generate the remaining samples and provide the full resolution prediction block.

The MIP mode is noted mode k on FIGS. 12 and 13 and is signaled as follows. For each intra CU, a flag indicates if MIP is used or not for the intra prediction of the considered CU. If a MIP mode is to be applied, the MIP mode of the considered CU is coded using a truncated binary code.

The number of supported MIP modes depends on block size. In one approach, 35 modes are available for blocks where max(W,H)<=8 && W*H<32. And 19 and 11 modes are used for max(W,H)=8 and max(W,H)>8, respectively. In addition, two modes share the same matrix and offset vector to reduce the memory requirement as follows:

$$m=\begin{cases}\text{mode} & \text{for } W=H=4 \text{ and mode}<18\\ \text{mode}-17 & \text{for } W=H=4 \text{ and mode}\ge 18\\ \text{mode} & \text{for } \max(W,H)=8 \text{ and mode}<10\\ \text{mode}-9 & \text{for } \max(W,H)=8 \text{ and mode}\ge 10\\ \text{mode} & \text{for } \max(W,H)=8 \text{ and mode}<6\\ \text{mode}-5 & \text{for } \max(W,H)=8 \text{ and mode}\ge 6\end{cases}.$$

Similarly to conventional intra prediction modes, the MIP predicted residual are allowed to employ the multiple transform selection (MTS) as well as Low-Frequency Non-Separable Transform (LFNST). However, the combination of MIP and ISP is not allowed. In other words, if a CU is partitioned with ISP, only regular prediction is allowed and MIP cannot be used.

Figure 26:
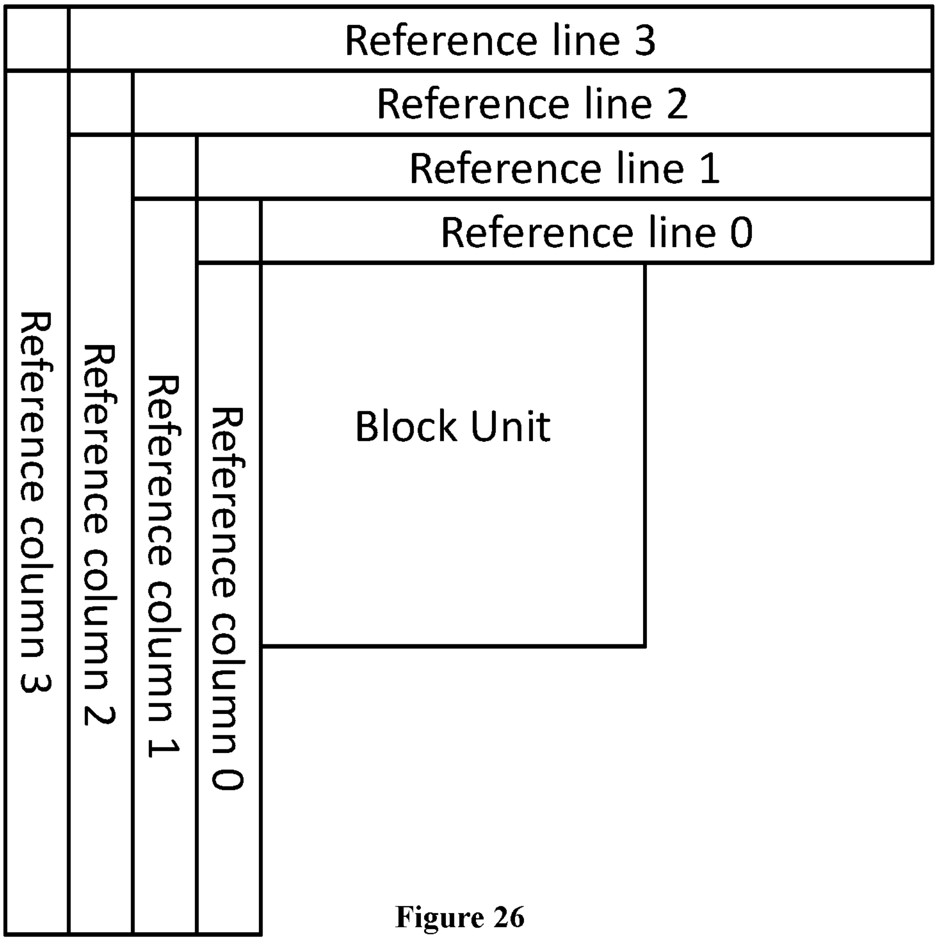
FIG. 26 illustrates an example of reference lines that may be used for Multiple Reference Line intra prediction.

FIG. 26 illustrates an example of reference lines that may be used for Multiple Reference Line intra prediction. For this prediction mode, the angular intra prediction of a Luma block is based on reconstructed reference samples that belong to one reference line and column respectively above and at the left of current CU, chosen among a set of reference lines. Each reference line can be identified by its index, as 0, 1, 2, and 3, as shown in FIG. 26. In one example approach, only three reference lines are used: lines 0, 1 and 3. The reference line used for intra prediction may be signaled in the bit-stream through the syntax element 'intra_luma_ref_idx'. The 'intra_luma_ref_idx' flag can be coded as follows. It can be binarized as a Truncated Rice bin string, meaning it is coded by a series of regular CABAC bins equal to 1, terminated by a regular CABAC bin equal to 0. Overall, up to 3 bins can be signaled. In one example approach, up to two bins are signaled as only three reference lines are used.

Figure 27:
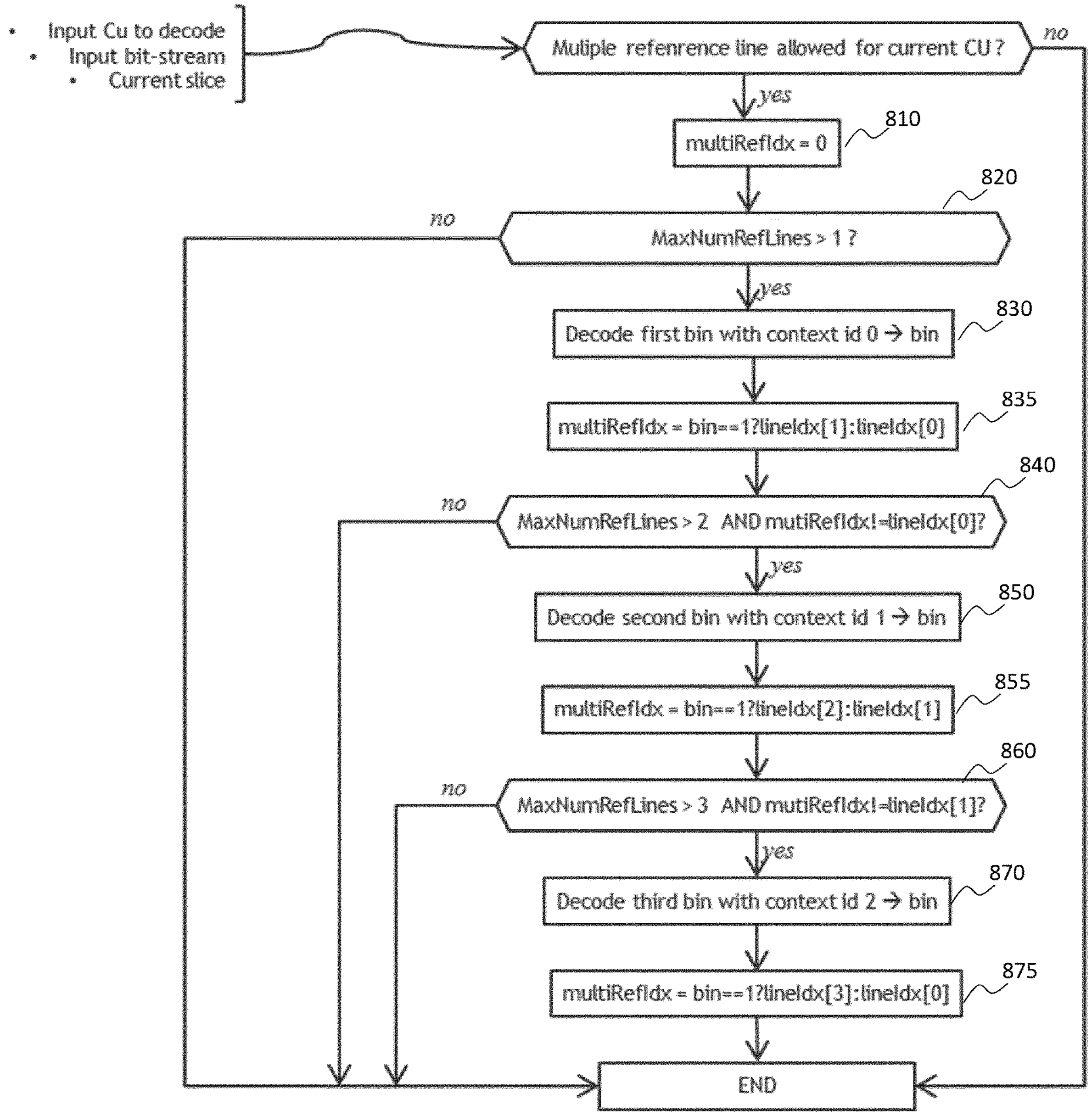
FIG. 27 illustrates an example of decoding process for the Multiple Reference Line intra prediction.

FIG. 27 illustrates an example of decoding process for the Multiple Reference Line intra prediction. The figure shows a generic process involving up to 4 reference lines. The array lineIDx[•] is made of 4 line reference index, and the value 'MaxNumRefLines' represents the maximum number of allowed reference lines for intra prediction. This is equal to 3 in one example approach, and the array lineIdx is made of the following element:

lineIdx={0,1,3}

The decoding process of the syntax element 'intra_luma_ref_idx' proceeds as follows. The output of the process is the decoded value for multiRefIdx indicating which reference line should be used. First the output value multiRefIdx is initialized to 0, in step 810. Next, in step 820, if no more than 1 reference line is allowed, then the process is ended and returns 0 as the reference line to be used. In step 830, a CABAC regular bin is parsed with a single CABAC context, with index 0. In step 835, if the bin is equal to 1 then multiRefIdx is set equal to lineIdx[1]. Otherwise, the multiRefIdx value is unchanged and the process will be terminated in step 840. Also, in step 840, if MaxNumRefLines is not strictly higher than 2, then the process is terminated. Else, in step 850, a second regular CABAC bin is decoded with a single context with index 1. In step 855, if the bin is equal to 1 then multiRefIdx is set equal to lineIdx[2]. Otherwise, the multiRefIdx value is unchanged and the process will be terminated in step 860. Also, in step 860, if MaxNumRefLines is not strictly higher than 3, then the process is terminated. Else, in step 870, a third regular CABAC bin is decoded with a single context with index 2. In step 875, if the bin is equal to 1 then multiRefIdx is set equal to lineIdx[3]. Otherwise, the multiRefIdx value is unchanged and keeps the value lineIdx[2].

The present document describes multiple embodiments that have been conceived with the foregoing in mind.

Various methods and other aspects described in this application can be performed by the processor 301 of a device 300 (FIG. 3) implementing a video encoder 100 (FIG. 1) or a video decoder 200 (FIG. 2). Therefore, the encoder 100 of FIG. 1, decoder 200 of FIG. 2 and system 1000 of FIG. 3 are configured to implement at least one of the embodiments described below. In other words, their encoding and decoding process are configured to process the new syntax described hereunder. The encoder generates a bitstream signal compliant with the embodiments described below.

The following embodiments relate to the selection of the pair of transforms for a TU in a CU coded in ISP mode and the corresponding signaling in the bitstream. Such embodiments allow to improve compression efficiency of the video codec by providing the ability of having different transforms for the TUs, compared to the case of FIG. 5 where the separable transform are fixed according to the TU size.

In at least one first embodiment, the primary transform for all TUs of an intra CU coded in ISP mode is explicitly signaled. Such signaling is done at the CU level and uses MTS index nits idx that is used for coding units not coded in ISP mode. The same condition for coding the MTS index are applied as for coding units coded in ISP mode than those coded in another mode.

In particular, for non ISP intra CUs, the signaling of the MTS index mts_idx depends on the position of the last significant quantized coefficient contained in the considered coding unit: if the last position is at least 16 in x- or y-coordinate in the luma CB of the CU, then the MTS index of the CU is inferred to zero, meaning the DCT2_DCT2 primary 2D transform is used in current CU. In the present embodiment, if the MTS index is equal to zero, then DCT2_DCT2 is used as the primary 2D transform for each TU the CU. If the MTS index nits idx is different from 0, then the 2D transform corresponding to the MTS index is used for each TU in the luma component of the considered CU. This includes the 2 or 4 luma transform blocks contained in the considered CU. This first embodiment is illustrated by FIG. 7.

Figure 7:
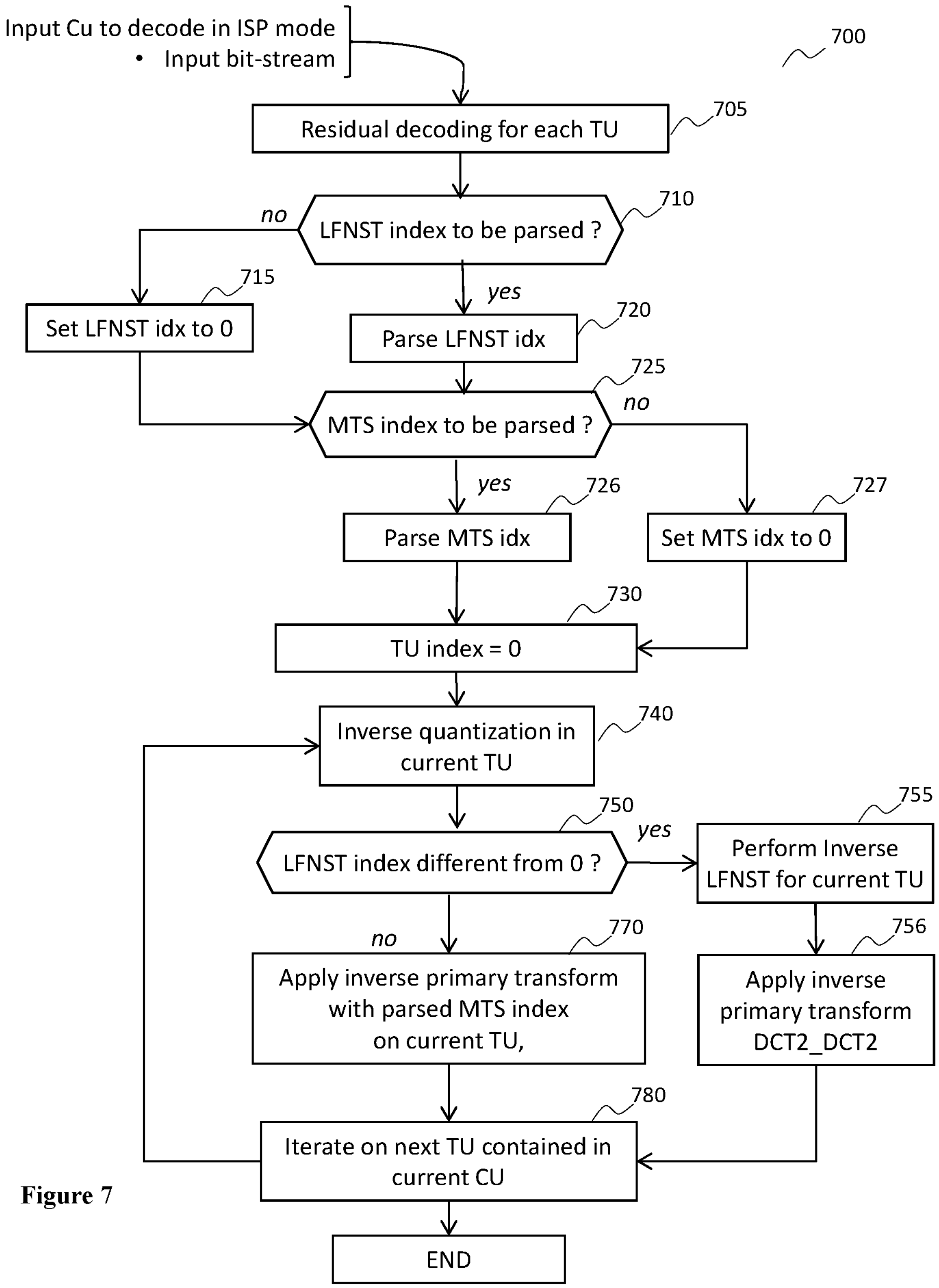
FIG. 7 illustrates an example embodiment of parsing and decoding process where the primary transform for the TUs is explicitly signaled at CU level.

FIG. 7 illustrates an example embodiment of parsing and decoding process where the primary transform for the TUs is explicitly signaled at CU level. This decoding process is implemented in the encoder 100 of FIG. 1, in the decoder 200 of FIG. 2 and in the system 1000 of FIG. 3. The decoding process 700 of an intra CU in ISP mode, according to the proposed embodiment, comprises the parsing of the MTS index mts_idx in step 726 if MTS is allowed for the current CU. This latter condition is tested in step 725. The conditions for parsing the MTS index mts_idx of an intra CU in ISP mode according to the first embodiment can for example be as follows:

- The intra CU is not in the chroma component in a slice coded in dual tree mode,
- The CU size in the considered component is at most 32 in width and height,
- The LFNST index associated to the current intra ISP CU is equal to zero,
- The tu_cbf_luma value associated to the coding unit is not equal to zero, meaning at least one luma TB in the CU has non-zero residual, or
- The condition on the last significant position at most equal to 15 in x- and y-coordinates is fulfilled for at least one TU in the CU.

When parsing is done, the MTS index identifies the pair of transforms to be used in step 770 on all TUs of the current CU. Other elements of the process 700 are similar than the equivalent ones in process 600 of FIG. 6. This first embodiment can be carried out by the coding unit syntax illustrated in the TABLE 3.

TABLE 3

| | |
|---|---|
| if( treeType != DUAL_TREE_CHROMA && lfnst_idx = = 0 && | |
| transform_skip_flag[ x0 ][ y0 ][ 0 ] = = 0 && Max( cbWidth, cbHeight ) <= 32 && | |
| cu_sbt_flag = = 0 && | |
| MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER && | |
| sps_explicit_mts_inter_enabled_flag ) \|\| | |
| ( CuPredMode[ chType ][ x0 ][ y0 ] = = MODE_INTRA && | |
| sps_explicit_mts_intra_enabled_flag ) ) ) | |
| mts_idx | ae(v) |
| } | |

This syntax authorizes the coding of explicit MTS and insertion of the MTS index mts_idx independently of the intra sub partitioning flag ISP_NO_SPLIT. As a result, explicit MTS coding is present also for CUs that use the ISP mode.

In variant embodiments of the first embodiment, different conditions need to be fulfilled in order to enable the use of explicit MTS for all TUs of a CUs. The variants may be combined together, except when being incompatible, to generate further variants comprising more or less conditions to enable implicit MTS.

In a variant of first embodiment, the condition for using explicit MTS is related to the last significant coefficient position in the luma TBs in the considered CU that must be at most equal to 15 in x- and y-coordinates for each TU in the CU. This better fits with the overall coding strategy for the non-ISP intra CU.

In another variant of first embodiment, the condition for using explicit MTS is that the position of the last significant coefficient is simply ignored. This allows more freedom and thus provides possibly better encoding performances. In an example embodiment, this flag is called MtsZeroOutSigCoeffFlag and the corresponding syntax is shown in TABLE 4.

TABLE 4

```
if( treeType != DUAL_TREE_CHROMA && lfnst_idx = = 0 &&
  transform_skip_flag[ x0 ][ y0 ][ 0 ] = = 0 && Max( cbWidth, cbHeight ) <= 32 &&
  cu_sbt_flag = = 0 && tu_cbf_luma[ x0 ][ y0 ] ) {
  if( ( ( CuPredMode[ chType ][ x0 ][ y0 ] = = MODE_INTER &&
    sps_explicit_mts_inter_enabled_flag ) ||
    ( CuPredMode[ chType ][ x0 ][ y0 ] = = MODE_INTRA &&
    sps_explicit_mts_intra_enabled_flag ) ) )
    mts_idx                                                        ae(v)
}
```

In multiple variants of first embodiment, the condition for using explicit MTS is depending on rules related to block sizes of the TU resulting from the ISP split, for example:

- TU is not larger than 32 in width and height,
- TU is not larger than 16 in width and height,
- TU size is at least 4 in width and height,
- TU size is at least 4 in width or height,
- TU size is at least 8 in width and height,
- TU size is at least 8 in width or height.

According to a variant embodiment, if the combination MTS/ISP is allowed for certain TU sizes, then for other TU sizes that can be generated through ISP splitting, the implicit MTS mechanism of FIG. 5 can be employed for ISP coding units.

In at least a second embodiment, the primary transform for all TUs of an intra CU coded in ISP mode is explicitly signaled for each TU. It uses the MTS index mts_idx that is used for coding units not coded in ISP mode. Such signaling is done at the TU level and thus one MTS index mts_idx is signaled per TU. The same condition for coding the MTS index mts_idx are applied as for coding units coded in ISP mode than those coded in another mode but at the TU level.

Figure 8:
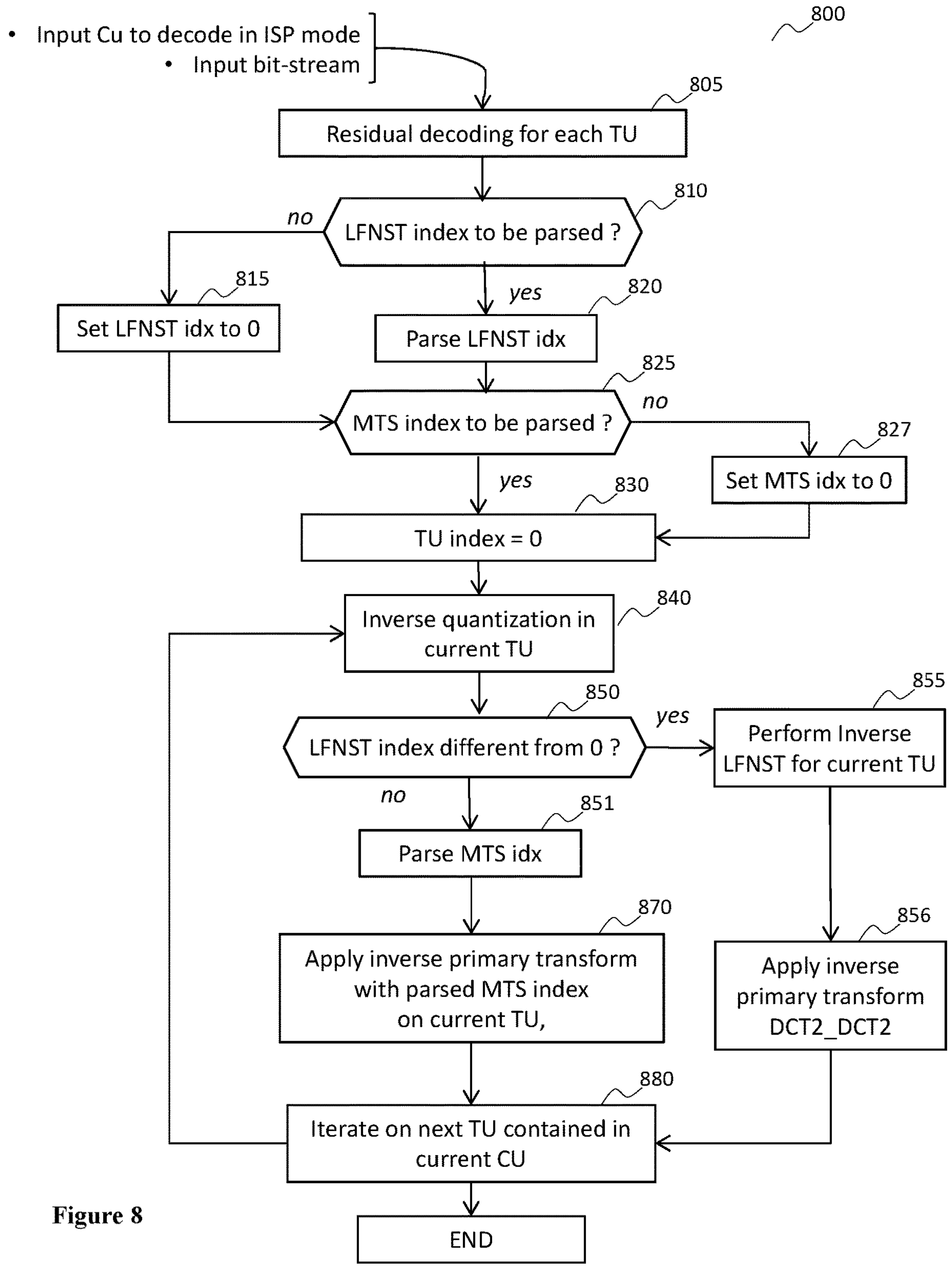
FIG. 8 illustrates an example embodiment of parsing and decoding process where the primary transform for the TUs is explicitly signaled at TU level.

FIG. 8 illustrates an example embodiment of parsing and decoding process where the primary transform for the TUs is explicitly signaled at TU level. The loop over the TUs contained in the CU, in steps 850 to 880, includes the parsing of the MTS index for each TU, in step 851. The other elements of the process 800 are unchanged compared to the process 700 of FIG. 7. With this second embodiment, different primary inverse transforms may be used for different TUs of a CU. This increases the coding efficiency compared to conventional process but also compared to the first embodiment. Indeed, some flexibility is introduced in the assignment of the MTS index to each TU inside coding units coded in ISP mode. Therefore, the encoder has more freedom regarding rate distortion optimization where it determines the best coding mode to use for an intra CU in ISP mode. Note that on the TU level, the MTS index is signaled only when no secondary transform is used (if the CU-level LFNST index is equal to zero). Otherwise, the DCT2_DCT2 primary inverse transform is used for all TUs.

ISP may result in small TU sizes, for example as small as 2×N, N×2, N×1, and 1×N. However, the syntax of some conventional video coding systems does not support MTS transform (DST7, DCT8) for blocks smaller than 4×4 and only support DCT2 transform up to a TU size of 2×2. Therefore, a compliant decoder would not know how to interpret the case where the MTS index mts-idx is greater than 0 for small TU's of sizes as listed above. This can be solved by at least one of the following techniques:

- Do not allow explicit MTS for TU sizes of 2×N, N×2, N×1, and 1×N,
- Allowing explicit MTS for TU sizes of 2×N and N×2 with DCT2 and DST7/DCT8 combination,
- Allowing explicit MTS for TU sizes of 1×N and N×1 DST7/DCT8,
- Adding 2×2 DST7 and DCT8.

The first technique is to prevent explicit MTS for TU sizes of 2×N, N×2, N×1, and 1×N. This can be done by adding an additional size constraint to enable the insertion of a MTS index mts_idx. In an example embodiment shown in TABLE 5, the coding unit syntax allows to implement this first technique in an example applied to the syntax of VVC by requiring that the smallest size to be greater than or equal to 4 to enable explicit MTS.

TABLE 5

```
coding_unit( x0, y0, cbWidth, cbHeight, cqtDepth, treeType, modeType ) {
...
    LfnstDcOnly = 1
    LfnstZeroOutSigCoeffFlag = 1
    MtsZeroOutSigCoeffFlag = 1
    transform_tree( x0, y0, cbWidth, cbHeight, treeType )
    lfnstWidth = ( treeType = = DUAL_TREE_CHROMA ) ? cbWidth / SubWidthC
                    : (IntraSubPartitionsSplitType = =
ISP_VER_SPLIT) ? cbWidth / NumIntraSubPartitions : cbWidth
    lfnstHeight = ( treeType = = DUAL_TREE_CHROMA ) ?
cbHeight / SubHeightC :
( IntraSubPartitionsSplitType = = ISP_HOR_SPLIT) ?
cbHeight / NumIntraSubPartitions : cbHeight
    if( Min( lfnstWidth, lfnstHeight ) >= 4 && sps_lfnst_enabled_flag = = 1 &&
      CuPredMode[ chType ][ x0 ][ y0 ] = = MODE_INTRA &&
      ( !intra_mip_flag[ x0 ][ y0 ] || Min( lfnstWidth, lfnstHeight ) >= 16 ) &&
      Max( cbWidth, cbHeight ) <= MaxTbSizeY) {
      if( ( IntraSubPartitionsSplitType ! = ISP_NO_SPLIT || LfnstDcOnly = = 0 ) &&
LfnstZeroOutSigCoeffFlag = = 1 )
        lfnst_idx[ x0 ][ y0 ]
    }
    if( treeType != DUAL_TREE_CHROMA && lfnst_idx[ x0 ][ y0 ] = = 0 &&
      transform_skip_flag[ x0 ][ y0 ] = = 0 && Max( cbWidth, cbHeight ) <= 32
&& Min(lfnstWidth,lfnstHeight)>=4 && ( !cu_sbt_flag ) &&
      MtsZeroOutSigCoeffFlag = = 1 && tu_cbf_luma[ x0 ][ y0 ] ) {
      if( ( ( CuPredMode[ chType ][ x0 ][ y0 ] = = MODE_INTER &&
        sps_explicit_mts_inter_enabled_flag )
        || ( CuPredMode[ chType ][ x0 ][ y0 ] = = MODE_INTRA &&
        sps_explicit_mts_intra_enabled_flag ) ) )
        mts_idx[ x0 ][ y0 ]
    }
...
```

The second technique is to allow explicit MTS for TU sizes of 2×N and N×2 with DCT2 and DST7/DCT8 combination. Using this technique, the longer dimension can use DST7 or DCT8, while the shorter one uses DCT2. This is because DCT2 for 2×2 size as well as DST7/DCT8 for 4×4 and larger sizes are conventionally supported. In an example application, the following syntax shown in TABLE 6 allows to implement this first technique in an example applied to VVC by requiring that the smallest size to be greater than or equal to 2 to enable explicit MTS.

TABLE 6

```
coding_unit( x0, y0, cbWidth, cbHeight, cqtDepth, treeType, modeType ) {
...
    LfnstDcOnly = 1
    LfnstZeroOutSigCoeffFlag = 1
    MtsZeroOutSigCoeffFlag = 1
    transform_tree( x0, y0, cbWidth, cbHeight, treeType )
    lfnstWidth = ( treeType = = DUAL_TREE_CHROMA ) ? cbWidth / SubWidthC
                    :     (     IntraSubPartitionsSplitType     = =
ISP_VER_SPLIT) ? cbWidth / NumIntraSubPartitions : cbWidth
    lfnstHeight = ( treeType = = DUAL_TREE_CHROMA ) ? cbHeight / SubHeightC
                                                          :
(          IntraSubPartitionsSplitType          = =
ISP_HOR_SPLIT) ? cbHeight / NumIntraSubPartitions : cbHeight
    if( Min( lfnstWidth, lfnstHeight )  >=  4  &&  sps_lfnst_enabled_flag  =  =  1
&&
      CuPredMode[ chType ][ x0 ][ y0 ]     = =     MODE_INTRA     &&
      ( !intra_mip_flag[ x0 ][ y0 ]  ||  Min( lfnstWidth, lfnstHeight )  >=  16  )  &&
      Max( cbWidth, cbHeight ) <= MaxTbSizeY) {
      if(  (  IntraSubPartitionsSplitType  !  =  ISP_NO_SPLIT || LfnstDcOnly  = = 0 ) &&
LfnstZeroOutSigCoeffFlag = = 1 )
        lfnst_idx[ x0 ][ y0 ]
    }
    if( treeType  !=  DUAL_TREE_CHROMA  &&  lfnst_idx[ x0 ][ y0 ] = =  0  &&
      transform_skip_flag[ x0 ][ y0 ] = = 0 && Max( cbWidth, cbHeight ) <= 32
&&                  Min(lfnstWidth,lfnstHeight)>=2                  &&
      ( !cu_sbt_flag )                                               &&
     MtsZeroOutSigCoeffFlag = = 1 && tu_cbf_luma[ x0 ][ y0 ] ) {
     if(   (   ( CuPredMode[ chType ][ x0 ][ y0 ]   = =   MODE_INTER   &&
       sps_explicit_mts_inter_enabled_flag )
       ||    ( CuPredMode[ chType ][ x0 ][ y0 ]    = =    MODE_INTRA   &&
       sps_explicit_mts_intra_enabled_flag ) ) )
       mts_idx[ x0 ][ y0 ]
    }
...
```

In other words, MTS is allowed only when at least the TU height or width is 2. It should be noted that TU's resulting from ISP have at least 16 coefficients. That is, 2×N and N×2 TU's have N>=8. Therefore, no need to add another condition to check if N is greater or equal to 4 to enable MTS.

However, the interpretation of MTS index needs to be adapted. Indeed, the MTS index mts_idx is conventionally interpreted as illustrated in TABLE 7 where TrTypeHor and TrTypeVer are the transform types for horizontal and vertical direction. In this table, DCT2, DST7 and DCT8 are respectively represented by the transform type values 0, 1 and 2.

TABLE 7

| mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

In the case of 2×N, the interpretation of MTS index mts_idx is done according to TABLE 8. Indeed, since the size of the vertical dimension is 2, only DCT2 is allowed and should be supported.

TABLE 8

| mts_idx[ x0 ][ y0 ] | 0 | 1 | 2 |
|---|---|---|---|
| trTypeHor | 0 | 1 | 2 |
| trTypeVer | 0 | 0 | 0 |

Similarly, in the case of N×2, the interpretation of MTS index mts_idx is done according to TABLE 9.

TABLE 9

| mts_idx[ x0 ][ y0 ] | 0 | 1 | 2 |
|---|---|---|---|
| trTypeHor | 0 | 0 | 0 |
| trTypeVer | 0 | 1 | 2 |

The third technique is to allow explicit MTS for TU sizes of 1×N and N×1 DST7/DCT8. In both cases, only one dimensional transform is applied to the longer dimension, where N>=16 to have at least 16 coefficients. On this dimension, either DCT2 is allowed (if MTS index is zero), or DST7 or DCT8 otherwise. The corresponding specification change is the same as in the first embodiment. However, the interpretation of the MTS index mts_idx must be further adapted by adding the TABLES 10 and 11 for respectively the case where size is 1×N and N×1 to TABLES 8 and 9.

TABLE 10

| mts_idx[ x0 ][ y0 ] | 0 | 1 |
|---|---|---|
| trTypeHor | 1 | 2 |

TABLE 11

| mts_idx[ x0 ][ y0 ] | 0 | 1 |
|---|---|---|
| trTypeVer | 1 | 2 |

The fourth technique is to add 2×2 DST7 and DCT8. To allow all combinations of MTS up to 2×N and N×2, 2×2 DST7 and DCT8 need to be added. This requires 8 bytes, since each transform require 4 elements (2×2 bytes). By doing so, the N×2 and 2×N can take any of the transforms combinations {DCT2,DCT2}, {DST7,DST7}, {DST7, DCT8}, {DCT8,DST7} or {DCT8,DCT8}.

Regarding high-level syntax, MTS can be controlled by 3 flags present in the sequence parameter set (SPS): sps_nits_enabled_flag, sps_explicit_mts_intra_enabled_flag and sps_explicit_mts_inter_enabled_flag. The sps_mts_enabled_flag sets all transforms to DCT2 when it is set to zero, otherwise non DCT2 transforms can be used (DST7 and/or DCT8). When sps_mts_enabled_flag is one, the following configurations are defined:

1—When sps_explicit_mts_intra_enabled_flag equals to zero: Implicit transform selection is used for all intra blocks (including ISP blocks) as well as subblock transform (SBT) blocks, where SBT is a transform tiling tool for inter coding units, 2—When sps_explicit_mts_intra_enabled_flag equals to one: Explicit transform selection is used for all intra blocks, whereas SBT and ISP use implicit transform selection, 3—When sps_explicit_mts_inter_enabled_flag equals to zero: DCT2 is used for all inter blocks (excluding SBT), 4—When sps_explicit_mts_inter_enabled_flag equals to one: explicit transform selection is used for all inter blocks (excluding SBT).

Figure 9A:
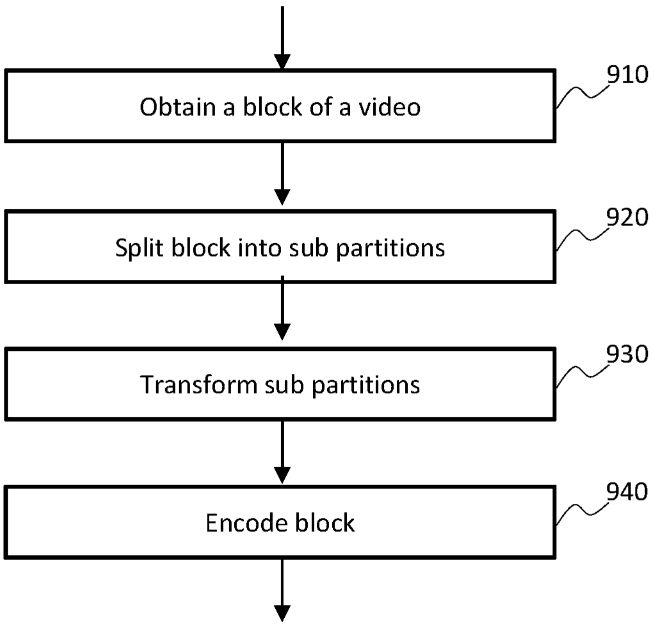
FIG. 9A illustrates an example of an encoding process according to at least an embodiment.

FIG. 9A illustrates an example of an encoding process according to at least an embodiment. In this example, the encoding process encodes the pair of selected transforms for a TU in a CU coded in ISP mode. A block of video is obtained in step 910. In step 920, the block is partitioned into sub partitions. This may be performed using the intra sub partitioning mode described above. Then, in step 930, for each of the partitions, samples of each sub-partition are transformed using a selected set of transforms. This may be performed using the set of transforms described above. In step 940, the block is then encoded as described above.

Figure 9B:
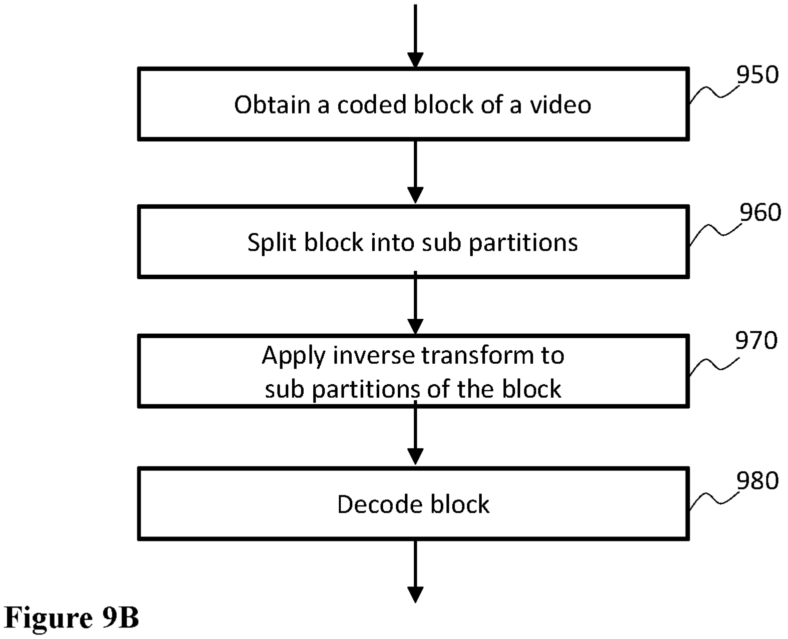
FIG. 9B illustrates an example of a decoding process according to at least an embodiment.

FIG. 9B illustrates an example of a decoding process according to at least an embodiment. In this example embodiment, the decoding process decodes a CU coded in ISP mode where the sub partitions are transformed using a set of transforms. In step 950, the coded block is obtained, as well as the related signaling information comprising information representative of the set of transforms used for encoding. In step 960, the block is partitioned into sub partitions. This may be performed using the intra sub partitioning mode described above. Then, in step 970, an inverse transform using the set of transforms used for encoding is applied to the samples of the sub partitions. In step 980, the block is then decoded as described above.

FIG. 10 illustrates a first example of transform process according to at least an embodiment. In this example, the embodiment is applied to the transform process of VVC. Explicit MTS for ISP is enabled when sps_explicit_mts_intra_enabled_flag=1. Otherwise, when this flag is set to zero, the default implicit selection is used or DCT2 is used.

FIG. 11 illustrates a second example of transform process according to at least an embodiment. In this example, the embodiment is applied to the transform process of VVC. An additional flag for enabling the explicit transform selection for ISP is used. Namely, sps_explicit_mts_isp_enabled_flag is added for example in the coding of the SPS as illustrated in TABLE 12. The meaning of the added SPS-level flag sps_explicit_mts_isp_enabled_flag is as follows: if it is equal to 1 then the use of explicit MTS signaling in CUs coded in ISP mode is allowed. Otherwise, if it is equal to zero then the explicit signaling of mts_idx for intra CUs coded in ISP mode is disabled.

TABLE 12

| seq_parameter_set_rbsp( ) { | Descriptor |
|---|---|
| ... | ... |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| sps_explicit_mts_isp_enabled_flag | u(1) |
| } | |

However, explicit signaling of the MTS comes at a cost. Different methods are proposed hereunder to limit the over cost.

A first method to limit the over cost of explicit signaling of the MTS is to limit the MTS index to values smaller than 4. Indeed, currently, MTS index can go up to 4 to cover all 4 combinations of DST7 and DCT8 as well as DCT2. However, it appears that all combinations are not actually needed. The maximum index could be set to 3, 2 or 1 to reduce the signaling over cost, at the price of reducing the number of combinations of transforms available. The transform selection remains the same as in TABLE 13.

TABLE 13

| mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

For example, if the maximum index is up to one, ISP transform selection can be switched between DCT2, DCT2 and DST7, DST7. In such case, the above TABLE may take the following shortened form of TABLE 14.

TABLE 14

| mts_idx[ x0 ][ y0 ] | 0 | 1 |
|---|---|---|
| trTypeHor | 0 | 1 |
| trTypeVer | 0 | 1 |

According to a variant of this embodiment, the implicit MTS mechanism associated to ISP may be included as a particular transform type in the explicit MTS system proposed for ISP. Thus, the implicit MTS mode of ISP described in the table of FIG. 5 and is associated with a particular transform index value. This typically leads to the TABLE 15 of correspondence between the MTS index and the type of transform used for a CU where the mts_idx value of 2 indicates an implicit selection, for example based on the table of FIG. 5.

TABLE 15

| mts_idx[ x0 ][ y0 ] | 0 | 1 | 2 |
|---|---|---|---|
| trTypeHor | 0 | 1 | Implicit |
| trTypeVer | 0 | 1 | Implicit |

According to a variant of this embodiment, the implicit MTS mechanism associated to ISP may be associated to the value of mts_idx equal to 1. In this variant, either the DCT2,DCT2 transform pair or the implicit transform type derived according to TABLE 5 may be used. This may typically leads to the TABLE 16 of correspondence between the MTS index and the type of transform used for a CU where the mts_idx value of 1 indicates an implicit selection, for example based on the table of FIG. 5.

TABLE 16

| mts_idx[ x0 ][ y0 ] | 0 | 1 |
|---|---|---|
| trTypeHor | 0 | Implicit |
| trTypeVer | 0 | Implicit |

Finally, according to a further variant, the activation of one of the above variants may depend on the block size, typically the TU size resulting from the CU split according to the ISP sub-partitioning.

A second method to limit the over cost of explicit signaling of the MTS is to distribute MTS indexes between intra prediction modes. In this method, the transform pairs are distributed between the prediction modes in order to reduce the length of MTS index. Specifically, odd intra prediction modes can use the mts indexes 0, 1 and 2, while even modes use 3 and 4 (vice versa). Furthermore, if maximum index is 3, odd modes can use the MTS indexes of 0 and 1, while the even modes use MTS indexes of 2 and 3, thus reducing the cost of signaling.

The following embodiments relate to using Matrix-Based Intra Prediction for blocks coded using the Intra Sub Partition mode. This allows to improve compression efficiency of the video codec. In other words, it allows to encode, signal and decode blocks for which the intra prediction splits a block into multiple sub blocks and where the prediction for the sub blocks is using matrix based intra prediction where a 2D matrix and 1D vector is applied to a vector based on the column of reconstructed reference samples on the left of the block and the line of reconstructed reference samples on top of the current block. The following embodiments describe the syntax as well as the process required to enable the combination of Matrix-Based Intra Prediction mode with the Intra Sub Partition mode for a given block when using VVC draft 7. Other video coding systems would employ another syntax to combine a matric based intra prediction with a sub partitioning of block into transform units.

FIG. 14 illustrates a first example embodiment of coding unit syntax enabling the combination of MIP and ISP. In this context, signaling the intra_subpartitions_mode_flag and intra_subpartition_split_flag independently of the intra_mip_flag allows the combination of MIP and ISP. Indeed, the ISP usage is signaled in section 980 whatever the value of the intra_mip_flag syntax element in section 940, thus allowing the combination of MIP and ISP for a given intra coding unit.

FIG. 15 illustrates a second example embodiment of coding unit syntax enabling the combination of MIP and ISP. In this context, signaling the MIP related elements in section 1040, after MRL and before the ISP related elements in section 1080, allows the combination of MIP and ISP.

FIG. 16 illustrates a third example embodiment of coding unit syntax enabling the combination of MIP and ISP. In this embodiment, ISP signaling in section 1180 is inserted before MRL and MIP is signaled in section 1140. In section 1110, MRL index is coded if ISP is not applied. This is to keep the current design as simple as possible where the combination of MRL and ISP is not allowed. However, a more complex encoder may allow this type of combination, as illustrated in FIG. 17.

FIG. 17 illustrates a fourth example embodiment of coding unit syntax enabling the combination of MIP and ISP. In this embodiment, ISP signaling in section 1280 is inserted before MRL and MIP is signaled in section 1240.

The combination of MIP and ISP further impacts the selection of the transform to be used. Indeed, on one hand, in the current design of ISP, the transform pair of TU's resulting from ISP partitioning is implicitly selected between DST7 and DCT2 as already mentioned earlier and shown in FIG. 5. On the other hand, explicit transform selection is allowed for MIP predicted residuals. That is, DCT2 transform can be used or combination of DST7 and DCT8 transform as normal intra predicted residuals. Thus, the transform selection process needs to be defined when combining MIP and ISP. At least one of the following methods may be used to this purpose:

Method 1: Implicit transform selection of ISP

Method 2: MIP-ISP residuals implicitly select DCT2 transform pair

Method 3: MIP-ISP residuals explicitly select transform pair from MTS

Method 4: High level syntax for switching between explicit and implicit transform selection In at least one embodiment, the transform selection uses a first method based on implicit transform selection of ISP among a set of predetermined pair of transforms, the selection being performed based on the block dimensions, as detailed in FIG. 5. Therefore, in this embodiment, the same implicit transform selection is used for normal ISP mode and in coding units where the MIP-ISP combination is used. According to a variant a CU-level flag indicates the use of this implicit transform selection used for the usual ISP case.

Additionally, this embodiment implies that the explicit transform mechanism formerly allowed with MIP is no more allowed when ISP is used in combination with MIP. This embodiment does not lead to any change of the coding unit level syntax.

In at least one embodiment, the transform selection uses a second method based on implicitly selecting the DCT2 transform pair. This is an example method of transform selection. According to one approach, if implicit transform selection is employed for all intra block, then MIP blocks will select DCT2. Therefore, DCT2 transform is a proper choice for MIP-ISP residual. FIG. 18 illustrates the transformation process for deriving the implicitMtsEnabled flag for an embodiment using the second method of transform selection. With this process, when MIP is applied, the implicit ISP transform selection is deactivated and DCT2 will be selected.

In at least one embodiment, the transform selection uses a third method based on explicitly selecting transform pairs from MTS. Since the current design allows MTS with MIP, MIP-ISP residual can still use MTS. However, MTS are allowed from block sizes of 4×4 up to 32×32, whereas ISP may result in TU's with dimensions larger than 32 or smaller than 4. Therefore, a check of TU size is needed before coding MTS index. FIG. 19 illustrates an extract of the coding unit syntax for an embodiment using the third method of transform selection. The specification of the transformation process stays the same as the one of FIG. 18.

In at least one embodiment, the transform selection uses a fourth method based on high level syntax for switching between explicit and implicit transform selection. In the current specification, MTS is controlled by 3 SPS flags: sps_mts_enabled_flag, sps_explicit_mts_intra_enabled_flag and sps_explicit_mts_inter_enabled_flag. When sps_mts_enabled_flag equals to zero, all transforms use DCT2. When this flag is set to one, the following configurations are defined. When sps_explicit_mts_intra_enabled_flag equals to zero: Implicit transform selection is used for all intra blocks (including ISP blocks). When this flag is set to one: Explicit transform selection is used for all intra blocks, whereas ISP use implicit transform selection. When sps_explicit_mts_inter_enabled_flag equals to zero: DCT2 is used for all inter blocks (excluding SBT). When this flag is set to zero: explicit transform selection is used for all inter blocks (excluding SBT).

In the fourth method for transform selection, if sps_explicit_mts_intra_enabled_flag is one, explicit MTS for MIP-ISP is used as described in the third method. If sps_explicit_mts_intra_enabled_flag is zero or sps_mts_enabled_flag is zero, DCT2 is used as described in the second method. FIG. 20 illustrates the transformation process for deriving the implicitMtsEnabled flag for an embodiment using the fourth method of transform selection. Basically, the implicit transform type for a current intra CU coded in ISP mode is used only if the high-level syntax element sps_explicit_mts_intra_enabled_flag indicates the explicit transform is not used for the considered sequence. Therefore, the implicit transform mechanism of ISP is deactivated when the SPS-level syntax element sps_explicit_mts_intra_enabled_flag indicates the use of explicit MTS in the considered VVC bit-stream.

Moreover, currently LFNST can be applied to MIP predicted residual if both TU width and height are larger or equal than 16. On the other hand, LFNST is applied to ISP residuals with the same condition as normal blocks (both TU width and height are larger or equal than 4). To unify this, in at least an embodiment, the LFNST usage applies the same rules than ISP for MIP-ISP combination. That is, MIP-ISP residuals can use LFNST if their TU's are larger than 4×4. FIG. 21 illustrates the corresponding syntax for an embodiment using Low-Frequency Non-Separable Transform.

The following embodiments aim relate to methods for reducing the signaling overhead and limiting the RD search.

A first method for reducing the signaling overhead is based on removing the MIP transposed flag. This allows to reduce the signaling by one bin. If ISP-MIP combination is employed, MIP transpose flag is inferred to be zero, where no transpose operation of the reference samples is performed. To perform that, ISP need to be signaled before MIP, such as for example as described in FIG. 15. FIG. 22 illustrates an extract of the coding unit syntax for an embodiment that removes the MIP transposed flag. In this syntax the intra_mip_transposed flag is coded only when ISP is not used.

A second method for reducing the signaling overhead is based on implicitly deducing the ISP split direction depending on MIP mode. In other words, intra_subpartitions_split_flag is not signaled when MIP-ISP combination is used but is rather deduced. For example, this can be achieved by setting the ISP direction to horizontal for even modes of MIP and vice versa. FIG. 23 illustrates an extract of the coding unit syntax for an embodiment wherein ISP split direction is deduced when MIP is combined with ISP.

In a variant, the split that results in thinner TU's is used, leading to horizontal split if height is smaller than width and vice versa.

A third method for reducing the signaling overhead is based on implicitly selecting MIP mode if MIP-ISP combination is used. In other words, intra_mip_mode is not signaled when ISP is used. It can be set to zero (first MIP mode is constantly used when ISP is used), or other modes depending on block dimension. In any case, ISP need to be signaled before MIP such as in the example of FIG. 15. FIG. 24 illustrates an extract of the coding unit syntax for an embodiment implicitly selecting MIP mode if MIP-ISP combination is used.

Figure 25A:
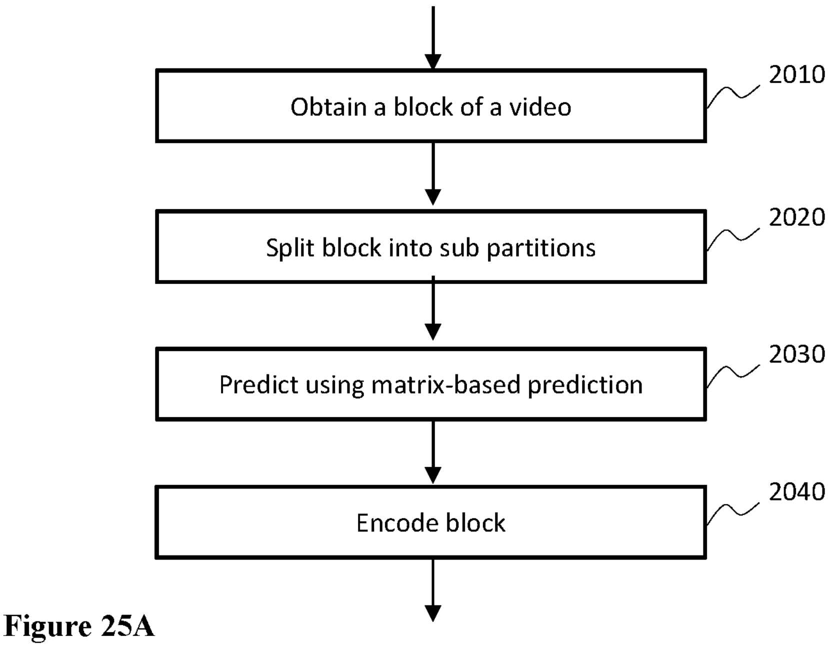
FIG. 25A illustrates an example embodiment of an encoding process that enables the combination of Matrix-Based Intra Prediction mode with the Intra Sub Partition mode.

FIG. 25A illustrates an example embodiment of an encoding process that enables the combination of Matrix-Based Intra Prediction mode with the Intra Sub Partition mode. A block of video is obtained in step 2010. In step 2020, the block is partitioned into sub partitions. This may be performed using the intra sub partitioning mode described above. Then, in step 2030, for each of the partitions, samples of each sub-partition are predicted using matrix-based intra prediction as described above. In step 2040, the block is then encoded as described above.

Figure 25B:
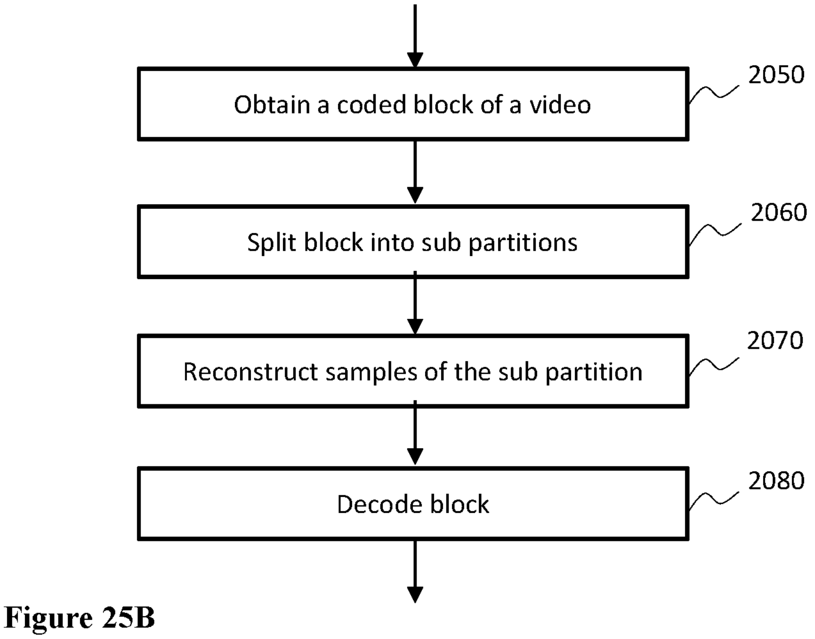
FIG. 25B illustrates an example embodiment of a decoding process that enables the combination of Matrix-Based Intra Prediction mode with the Intra Sub Partition mode.

FIG. 25B illustrates an example embodiment of a decoding process that enables the combination of Matrix-Based Intra Prediction mode with the Intra Sub Partition mode. In step 2050, the coded block is obtained, as well as the related signaling information comprising information representative of the matrix-based intra prediction mode and parameters used for encoding. In step 2060, the block is partitioned into sub partitions. This may be performed using the intra sub partitioning mode described above. Then, in step 2070, samples are reconstructed from the reconstructed neighbor samples using matrix-based intra prediction as described above. In step 2080, the block is then decoded as described above.

The now following embodiments relate to using Multiple Reference Lines Intra Prediction for blocks coded using the Intra Sub Partition mode. This allows to improve compression efficiency of the video codec. In other words, it allows to encode, signal, and decode blocks for which the intra prediction can split a block into multiple equal-sized sub-blocks while allowing each sub-block to be predicted based on any one of the multiple reference lines available. The prediction in each sub-block is performed using the prediction mode of the parent block.

Figure 28A:
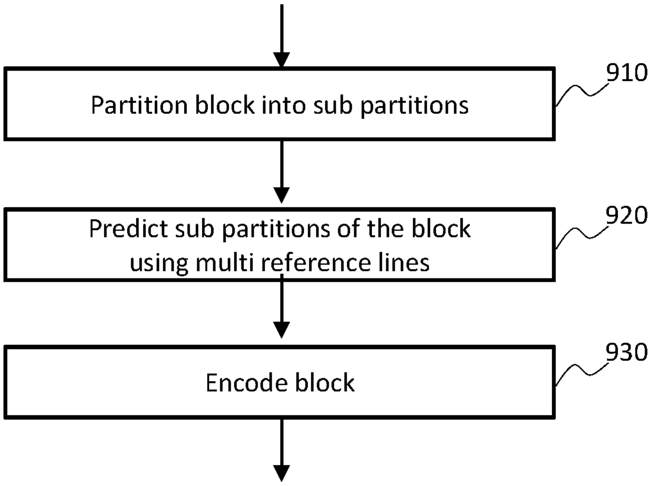
FIG. 28A illustrates an example of encoding process according to at least one embodiment.

FIG. 28A illustrates an example of encoding process according to at least one embodiment. In such embodiment, Multiple Reference Lines Intra Prediction mode is combined with the Intra Sub Partition mode. In step 910, the block is partitioned into sub partitions. This may be performed using the intra sub partitioning mode described above. Then, in step 920, for each of the partitions, samples of each sub-partition are predicted based on one of the multiple reference lines available. This may be performed using the multi reference line mode described above. In step 930, the block is then encoded as described above.

Figure 28B:
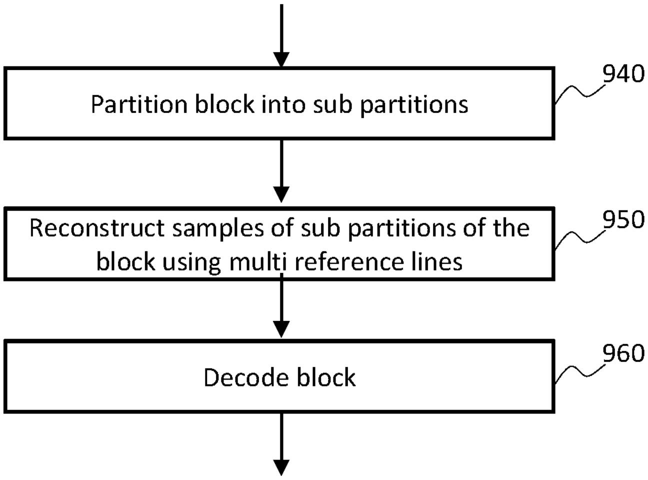
FIG. 28B illustrates an example of decoding process according to at least one embodiment.

FIG. 28B illustrates an example of decoding process according to at least one embodiment. In such embodiment, Multiple Reference Lines Intra Prediction mode is combined with the Intra Sub Partition mode. In step 940, the block is partitioned into sub partitions. This may be performed using the intra sub partitioning mode described above. Then, in step 950, for each of the partitions, samples of each sub-partition are reconstructed using a prediction based on one of the multiple reference lines available. This may be performed using the multi reference line mode described above. In step 950, the block is then decoded as described above.

The following embodiments describe the syntax as well as the process that are required to enable the combination of Multiple Reference Lines Intra Prediction mode with the Intra Sub-Partition mode for a given block in an example application to the syntax and processes of VVC draft 7. Other video coding systems may employ another syntax to combine a matrix based intra prediction (MIP) with a sub-partitioning of block into transform units.

FIG. 29 illustrates an example embodiment of coding unit syntax enabling the combination of MRL and ISP. Other video coding systems may employ another syntax to combine an intra sub-partitioning mechanism with a prediction using multiple reference lines.

Figure 30A:
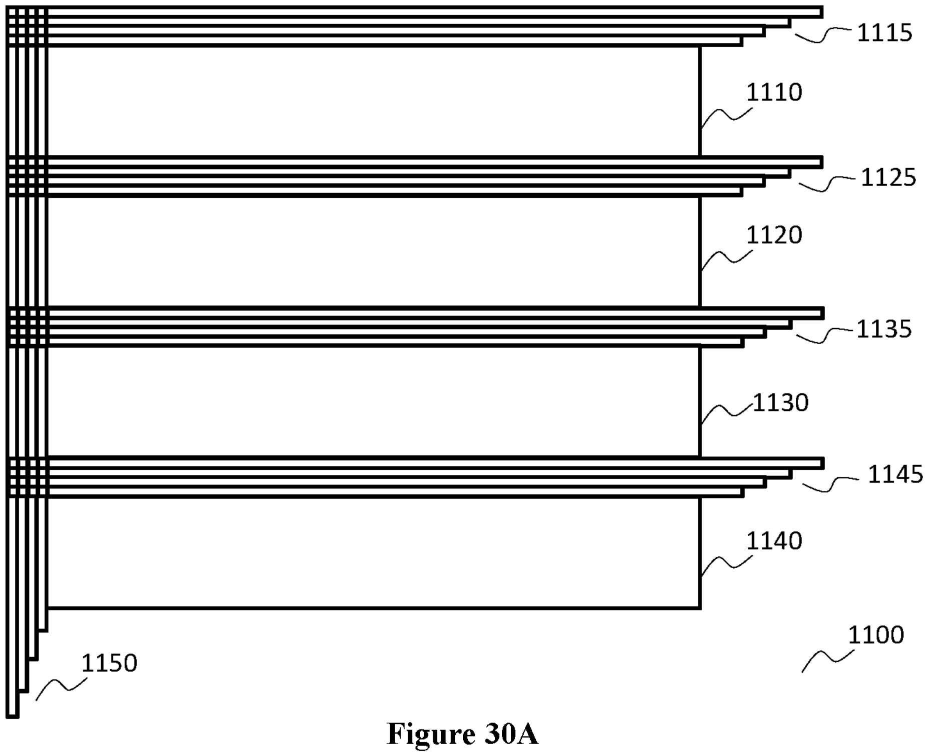
FIG. 30A illustrates an example embodiment of multi reference line intra prediction system in an intra sub partition coded coding unit.

FIG. 30A illustrates an example embodiment of multi reference line intra prediction system in an intra sub-partition coded coding unit. According to this embodiment, the MRL tool is used for each TU contained in the considered CU. For example, the TU 1110, 1120, 1130 and 1140 perform their intra prediction respectively using the multi reference lines 1115, 1125, 1135 and 1145. The reference line index used is the same for each TU and is signaled on the CU-level as for non-ISP CUs, for example through the intra_luma_ref_idx syntax element. FIG. 30A illustrates a horizontal split. In this case, the TUs are decoded sequentially from top to bottom. The reference lines for the second TU onwards consist of some decoded samples in the previous TUs. The reference line to be used for the prediction is selected for each TU based on the value of intra_luma_ref_idx.

The same principle applies for vertical split similarly. In this situation, the TUs are split vertically so that each TU benefits from the availability of multiple reference lines. Also, the reference line to be used for the prediction is selected for each vertical TU based on the value of intra_luma_ref_idx.

Figure 30B:
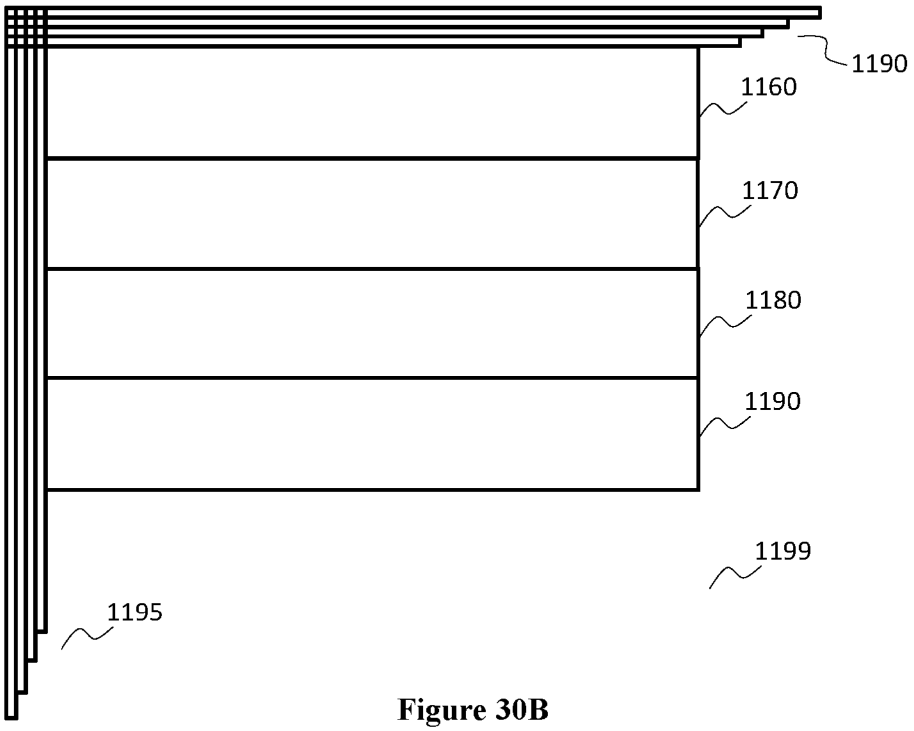
FIG. 30B illustrates a second example embodiment of multi reference line intra prediction system in an intra sub partition coded coding unit.

FIG. 30B illustrates a second example embodiment of multi reference line intra prediction system in an intra sub-partition coded coding unit. According to this embodiment, the prediction uses reference samples belonging to the reference line and column identified by the intra_luma_ref_idx syntax element for the intra prediction of the first TU among 2 or 4 TUs issued from ISP splitting. Next, for other TUs, a hybrid approach is used. The reference samples for TU borders located on the enclosing CU border are taken on the reference line indicated by the MRL index. For other reference samples, internal to the considered CU, the reference samples on the reference line closest to the considered TU are used to intra-predict the considered TU.

The embodiment shown in FIG. 29 has the disadvantage that, for each reference line, the encoder has to check the rate-distortion performance both with and without CU splits as permitted by ISP. This can make the encoder complexity prohibitively large. Therefore, in at least one embodiment, the rate-distortion optimization step is improved by forcing a CU split of one type whenever the reference line index is not equal to 0. The split type can be decided based on the directionality of the intra prediction mode. In this case, neither the intra_subpartitions_mode_flag nor the intra_subpartition_split_flag needs to be signaled, and the type of the split is automatically derived.

In another embodiment, the split is always performed whenever the reference line index is non-zero. However, instead of deriving the split type from the prediction mode, the split type is mapped to the reference line used. For example, in one version, we can have horizontal CU split if multiRefIdx is equal to 1 and vertical CU split if multiRefIdx is equal to 3. In another version, we can map the split type in the other way around.

FIG. 31 illustrates an example syntax for an embodiment using multi reference line intra prediction system in an intra sub-partition coded coding unit using matrix-based intra prediction. In this embodiment, the use of the three modes are combined using the syntax of FIG. 31.

In one approach, two transforms are specified for any TU, one to be applied on the left (vertical transform) and the other to be applied on the right (horizontal transform), of the prediction residual. When using ISP, the transform pairs for the TU's resulting from ISP partitioning is implicitly selected between DST7 and DCT2. DST7 horizontal transform is used if the TU width is between 4 and 16 included, otherwise DCT2 is used as the horizontal transform. Similarly, the vertical DST7 transform is used in case the TU height is between 4 and 16 included, otherwise DCT2 is used. In any case, either the DST7×DCT2 or DCT2×DST7 2D separable primary transform is used. On the other hand, explicit transform selection is allowed for MRL predicted residuals. That is, either DCT2 transform can be used, or combination of DST7 and DCT8 transform, as normally applied on intra predicted residuals. Thus, the transform process needs to be defined when MRL-ISP combination is applied. Three different methods to determine the transform in this case are proposed.

A first method is based on an implicit transform selection. In this case, the same separate primary transform selection as described in FIG. 5 is used. Therefore, in this embodiment, the same implicit transform selection is used for normal ISP mode and in coding units where the MRL-ISP combination is used. According to a variant of this method, a CU-level flag indicates the use of this implicit transform selection used for the usual ISP case. Additionally, this embodiment implies that the explicit transform mechanism allowed with MRL in the prior art is no more allowed when ISP is used in combination with MRL.

A second method is based on implicitly selecting the DCT2 transform pair. This is a straightforward method of transform selection and is a proper choice for MRL-ISP residual since this is the same selection that is done when implicit transform selection is employed for all intra block. The FIG. 32 illustrates the derivation process to determine the implicitMTS variable according to the second method. This figure shows an example application of the second method to the syntax and processes of VVC draft 7 and more particularly to the derivation process for implicitMTS. Using this method, when MRL is applied, the implicit ISP transform selection is deactivated and DCT2 will be selected.

A third method is based on explicit selection of transform pair from MTS. Indeed, since MTS is allowed with MRL, MRL-ISP residual can still use MTS. However, MTS is allowed from block sizes of 4×4 up to 32×32, whereas ISP may result in TU's with dimensions larger than 32 or smaller than 4. Therefore, a corresponding check of TU size is needed before coding MTS index. FIG. 33 illustrates an example of coding according to the third method and FIG. 34 illustrates the derivation process to determine the implicitMTS variable according to the third method.

Regarding high-level syntax, MTS can be controlled by 3 flags present in the sequence parameter set (SPS): sps_mts_enabled_flag, sps_explicit_mts_intra_enabled_flag, and sps_explicit_mts_inter_enabled_flag. The sps_mts_enabled_flag sets all transforms to DCT2 when it is set to zero, otherwise non DCT2 transforms are used (DST7 and/or DCT8). When sps_mts_enabled_flag is 1, the following configurations are defined:

1—When sps_explicit_mts_intra_enabled_flag equals to 0: Implicit transform selection is used for all intra blocks (including ISP blocks) as well as subblock transform (SBT) blocks, where SBT is a transform tiling tool for inter prediction, 2—When sps_explicit_mts_intra_enabled_flag equals to 1: Explicit transform selection is used for all intra blocks, whereas SBT and ISP use implicit transform selection, 3—When sps_explicit_mts_inter_enabled_flag equals to 0: DCT2 is used for all inter blocks (excluding SBT), 4—When sps_explicit_mts_inter_enabled_flag equals to 1: explicit transform selection is used for all inter blocks (excluding SBT).

FIG. 35 illustrates a first example of transform process according to at least an embodiment. Explicit MTS for ISP is enabled when sps_explicit_mts_intra_enabled_flag=1 Otherwise, when this flag is set to zero, the default implicit selection is used or DCT2 is used.

FIG. 36 illustrates a second example of transform process according to at least an embodiment. An additional flag for enabling the explicit transform selection for ISP is used. Namely, sps_explicit_mts_isp_flag is added for example in the coding of the SPS as illustrated in TABLE 17.

TABLE 17

| seq_parameter_set_rbsp( ) { | Descriptor |
|---|---|
| ... | ... |
| sps_mts_enabled_flag | u(1) |
| if( sps_mts_enabled_flag ) { | . . . |
| sps_explicit_mts_intra_enabled_flag | u(1) |
| sps_explicit_mts_inter_enabled_flag | u(1) |
| sps_explicit_mts_isp_flag | u(1) |
| } | |

Figure 37A:
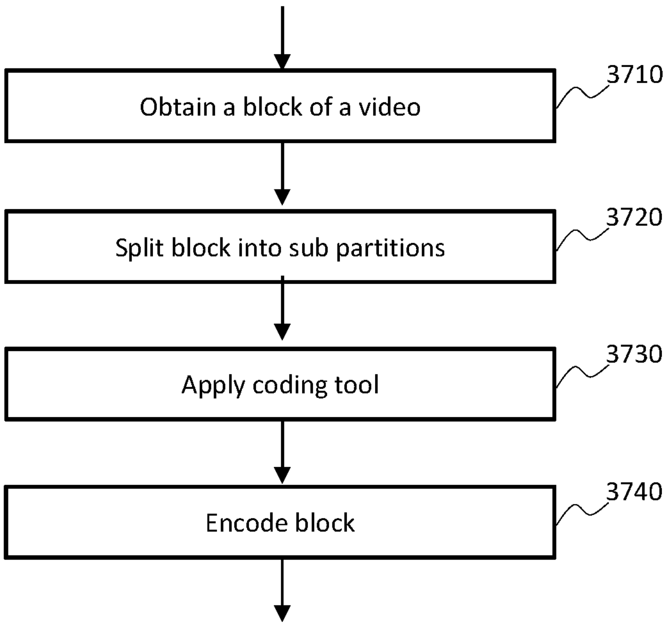
FIG. 37A illustrates an example of an encoding process combining the embodiments described above.

FIG. 37A illustrates an example of an encoding process combining the embodiments described above. In this example embodiment, the encoding process obtains a block of video in step 3710. In step 3720, the block is partitioned into sub partitions. This may be performed using the intra sub partitioning mode described above. Then, in step 3730, for each of the partitions, one of the available coding tool of the video coding system is applied to the samples of the sub partitions as previously described in the different embodiments. In step 3740, the block is then encoded as described above, and related signaling information is generated, the signaling information comprising information representative of the coding tool and associated parameters used for encoding.

Figure 37B:
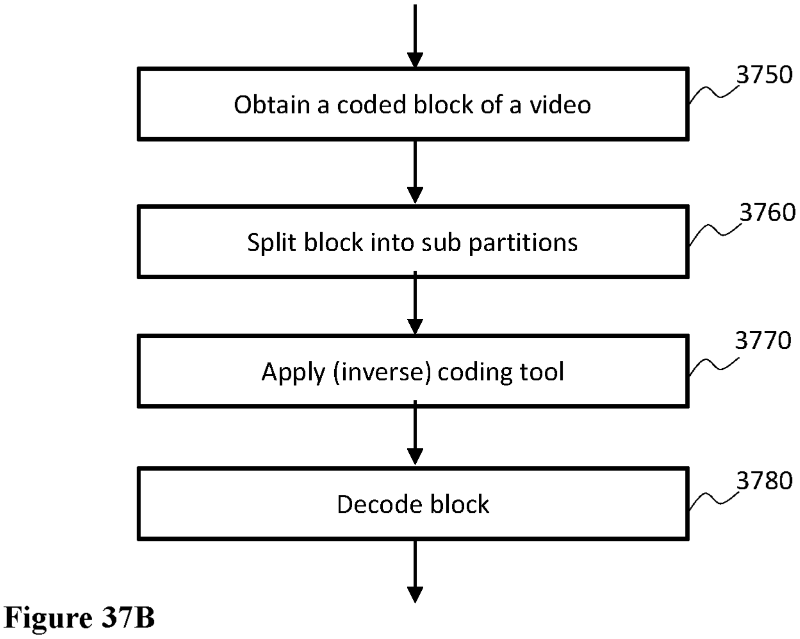
FIG. 37B illustrates an example of a decoding process combining the embodiments described above.

FIG. 37B illustrates an example of a decoding process combining the embodiments described above. In this example embodiment, the decoding process decodes a coding unit that has been encoded using the intra sub partitioning mode described above. In step 3750, the coded block is obtained, as well as the related signaling information comprising information representative of the coding tool and associated parameters used for encoding. In step 3760, the block is partitioned into sub partitions. This may be performed using the intra sub partitioning mode described above. Then, in step 3770, for each of the partitions, one of the available coding or decoding tool of the video coding system (may be the inverse tool of the coding tool using at encoding or the same tool, according to the tool used) is applied to the samples of the sub partitions as previously described in the different embodiment. In step 3780, the block is then decoded as described above.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, the embodiments presented in FIGS. 9A, 9B, 25A, 25B, 28A, 28B, 37A and 37B.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, the embodiments of FIG. 9A, 9B, 25A, 25B, 28A, 28B, 37A or 37B.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well. The aspects described and contemplated in this application can be implemented in many different forms. FIGS. 1, 2 and 3 above provide some embodiments, but other embodiments are contemplated, and the discussion of figures does not limit the breadth of the implementations.

In the present application, the terms "reconstructed" and "decoded" may be used interchangeably, the terms "pixel" and "sample" may be used interchangeably, the terms "image," "picture" and "frame" may be used interchangeably, the terms "index" and "idx" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example regarding block sizes. The specific values are for example purposes and the aspects described are not limited to these specific values.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted.

The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method comprising:
- obtaining information representative of a block of a video, wherein the block is coded using an intra-sub partition mode and the block is partitioned into sub partitions;
- obtaining a syntax element representative of a reference line index, wherein the syntax element is signaled at the block level;
- partitioning the block into sub partitions;
- selecting a single reference line based on the reference line index;
- for each of the sub partitions, predicting samples of the sub partitions based on applying a 2D matrix and 1D vector to a vector based on averaged samples of the single reference line;
- applying an inverse transform to the sub partitions; and decoding the block;
- wherein the single reference line is selected from among multiple reference lines adjacent to a top line of the block or to a left column of the block and is used to predict all the sub partitions of the block.

2. A method comprising, for a block of a video coded using an intra-sub partition mode:
- partitioning the block into sub partitions;
- selecting a single reference line from among multiple reference lines adjacent to a top line of the block or to a left column of the block;
- for each of the sub partitions, predicting samples of the sub partitions based on applying a 2D matrix and 1D vector to a vector based on averaged samples of the single reference line;
- applying a transform to the sub partitions; and
- encoding the block and signaling information, wherein the block is coded in intra-sub partition mode and the signaling information comprises a syntax element representative of a reference line index used for the predicting, wherein the syntax element is signaled at the block level;
- wherein the single reference line is used to predict all the sub partitions of the block.

3. A video encoding apparatus comprising a processor configured to, for a block of a video coded using an intra-sub partition mode:
- partition the block into sub partitions;
- select a single reference line from among multiple reference lines adjacent to a top line of the block or to a left column of the block;
- for each of the sub partitions, predict samples of the sub partitions based on applying a 2D matrix and 1D vector to a vector based on averaged samples of the single reference line;
- apply a transform to the sub partitions; and
- encode the block and signaling information, wherein the block is coded in intra-sub partition mode and the signaling information comprises a syntax element representative of a reference line index used for the predicting, wherein the syntax element is signaled at the block level;
- wherein the single reference line is used to predict all the sub partitions of the block.

4. A video decoding apparatus comprising a processor configured to:
- obtain information representative of a block of a video, wherein the block is coded using an intra-sub partition mode and the block is partitioned into sub partitions;
- obtain a syntax element representative of a reference line index, wherein the syntax element is signaled at the block level;
- partition the block into sub partitions;
- select a single reference line based on the reference line index;
- for each of the sub partitions, predict samples of the sub partitions based on applying a 2D matrix and 1D vector to a vector based on averaged samples of the single reference line;
- apply an inverse transform to the sub partitions; and decode the block;
- wherein the single reference line is selected from among multiple reference lines adjacent to a top line of the block or to a left column of the block and is used to predict all the sub partitions of the block.

5. A non-transitory computer readable medium comprising program code instructions executable by a processor for implementing the method according to claim 1.

6. A non-transitory computer readable medium comprising program code instructions executable by a processor for implementing the method according to claim 2.

7. The method of claim 1, wherein the type of partitioning is horizontal or vertical according to the value of the reference line index.

8. The method of claim 1, wherein the type of partitioning is horizontal when the reference line index is equal to 1 and vertical when the reference line index is equal to 3.

9. The method of claim 1, wherein the type of partitioning is horizontal when the reference line index is equal to 3 and vertical when the reference line index is equal to 1.

10. The method of claim 2, wherein the type of partitioning is horizontal or vertical according to the value of the reference line index.

11. The method of claim 2, wherein the type of partitioning is horizontal when the reference line index is equal to 1 and vertical when the reference line index is equal to 3.

12. The method of claim 2, wherein the type of partitioning is horizontal when the reference line index is equal to 3 and vertical when the reference line index is equal to 1.

13. The apparatus of claim 3, wherein the type of partitioning is horizontal or vertical according to the value of the reference line index.

14. The apparatus of claim 3, wherein the type of partitioning is horizontal when the reference line index is equal to 1 and vertical when the reference line index is equal to 3.

15. The apparatus of claim 3, wherein the type of partitioning is horizontal when the reference line index is equal to 3 and vertical when the reference line index is equal to 1.

16. The apparatus of claim 4, wherein the type of partitioning is horizontal or vertical according to the value of the reference line index.

17. The apparatus of claim 4, wherein the type of partitioning is horizontal when the reference line index is equal to 1 and vertical when the reference line index is equal to 3.

18. The apparatus of claim 4, wherein the type of partitioning is horizontal when the reference line index is equal to 3 and vertical when the reference line index is equal to 1.

* * * * *